(12) United States Patent
Bradford

(10) Patent No.: US 9,705,594 B2
(45) Date of Patent: Jul. 11, 2017

(54) OPTICAL COMMUNICATION FOR SOLID-STATE LIGHT SOURCES

(71) Applicant: Cree, Inc., Durham, NC (US)

(72) Inventor: Everett Bradford, Apex, NC (US)

(73) Assignee: Cree, Inc., Durham, NC (US)

( * ) Notice: Subject to any disclaimer, the term of this patent is extended or adjusted under 35 U.S.C. 154(b) by 405 days.

(21) Appl. No.: 13/835,900

(22) Filed: Mar. 15, 2013

(65) Prior Publication Data

US 2014/0270793 A1    Sep. 18, 2014

(51) Int. Cl.
*H04B 10/116* (2013.01)
*H05B 33/08* (2006.01)

(52) U.S. Cl.
CPC ......... *H04B 10/116* (2013.01); *H05B 33/089* (2013.01); *H05B 33/0815* (2013.01); *H05B 33/0824* (2013.01)

(58) Field of Classification Search
CPC .. H04B 10/116; H05B 33/08; H05B 33/0893; H05B 37/02
USPC ........................................... 398/118; 315/185
See application file for complete search history.

(56) References Cited

U.S. PATENT DOCUMENTS

| 2006/0239689 A1* | 10/2006 | Ashdown | H04B 10/1141 |
| | | | 398/130 |
| 2007/0273290 A1* | 11/2007 | Ashdown | F21V 29/004 |
| | | | 315/113 |
| 2008/0048582 A1* | 2/2008 | Robinson | 315/291 |
| 2008/0183081 A1* | 7/2008 | Lys | A61N 5/0616 |
| | | | 600/477 |
| 2009/0251068 A1* | 10/2009 | Holec | F21V 23/005 |
| | | | 315/294 |

(Continued)

FOREIGN PATENT DOCUMENTS

| CA | WO 2008025153 A1 * | 3/2008 | ............... H03K 7/08 |
| WO | 2008025153 A1 | 3/2008 | |
| WO | WO 2008025153 A1 * | 3/2008 | ............. H05B 33/08 |

OTHER PUBLICATIONS

International Search Report and Written Opinion for PCT/US2014/023916, mailed Jun. 16, 2014, 7 pages.

(Continued)

*Primary Examiner* — David Payne
*Assistant Examiner* — Omar S Ismail
(74) *Attorney, Agent, or Firm* — Withrow & Terranova, P.L.L.C.

(57) ABSTRACT

The disclosure relates to a lighting fixture, which includes an array of solid-state light sources that are configured to generate light for general illumination lighting purposes and control circuitry. A drive signal is used to drive solid-state light sources. The control circuitry is configured to use a control output to control the drive signal to at least one of the solid-state light sources. The control output is configured to control the drive signal to 1) set at least one characteristic of the light generated by the array of the solid-state light sources, and 2) modulate the light with data for transmission. The light is modulated such that any change in the at least one characteristic based on the light being modulated is anthropically imperceptible. The characteristic of the light generated by the array of solid-state light sources may include the intensity, color, color temperature and the like.

21 Claims, 17 Drawing Sheets

(56) References Cited

U.S. PATENT DOCUMENTS

2009/0297166 A1\* 12/2009 Nakagawa ............... G09F 9/33
 398/172
2012/0086345 A1\* 4/2012 Tran ................... F24F 11/0009
 315/158

OTHER PUBLICATIONS

Examination Report for European Patent Application No. 14714109.7, mailed Jul. 22, 2016, 4 pages.
International Preliminary Report on Patentability for International Patent Application No. PCT/US2014/023916, mailed Sep. 24, 2015, 5 pages.
Examination Report for European Patent Application No. 14714109.7, mailed Mar. 10, 2017, 5 pages.

\* cited by examiner

OPTICAL COMMUNICATION FOR SOLID-STATE LIGHT SOURCES

FIELD OF THE DISCLOSURE

This disclosure relates generally to lighting fixtures for solid-state light sources and related circuitry.

BACKGROUND

Solid-state lighting devices typically employ an array of light-emitting diodes (LEDs) as a light source. In a lighting fixture that includes the array of LEDs, control electronics are provided to provide different types of functionality associated with generating light with the array of LEDs. However, a manufacturer of these lighting fixtures or a designer seeking to design a lighting network that employs these lighting fixtures may need to obtain operational information, such as color temperature parameters, thermal temperature parameters, and/or lifetime parameters, regarding the operation of the LEDs in the array. As such, lighting fixtures may include expensive communication circuitry in order to communicate this operational information to remote devices. Accordingly, it would be advantageous to be able to communicate operational information without requiring additional communication circuitry.

SUMMARY

The disclosure relates to a lighting fixture, which includes an array of solid-state light sources that are configured to generate light for general illumination lighting purposes and control circuitry. A drive signal is used to drive solid-state light sources. The control circuitry is configured to use a control output to control the drive signal to at least one of the solid-state light sources. The control output is configured to control the drive signal to 1) set at least one characteristic of the light generated by the array of the solid-state light sources, and 2) modulate the light with data for transmission. The light is modulated such that any change in the at least one characteristic based on the light being modulated is anthropically imperceptible. The characteristic of the light generated by the array of solid-state light sources may include the intensity, color, color temperature and the like.

The solid-state lighting sources may be light emitting diodes (LEDs). The array of solid-state lighting sources may include one or more strings of LEDs. As such, the drive current to all of the LEDs in the array or a subset of the LEDs in the array may be controlled to help set the characteristic of the light for the entire array. The LEDs may be arranged in one or more strings wherein the subset of LEDs is in one string or spread among multiple strings. The array or the subset of LEDs may include LEDs of the same color or different colors.

The control output may be one or more pulse-width modulated (PWM) signals, which can vary in frequency (period) and duty cycle. In one embodiment, the duty cycle of the PWM signal(s) is used to control the characteristic of the light. The frequency of the PWM signal(s) may can be varied to modulate the light. To maintain a characteristic of the light while the PWM signal is changing frequencies while modulating the light or between transmission states, the duty cycle of the PWM signal is kept constant. Keeping the duty cycle constant effectively maintains an average amount of drive current flowing through the array of LEDs, and thus, avoids perceptible changes in the light during modulation.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
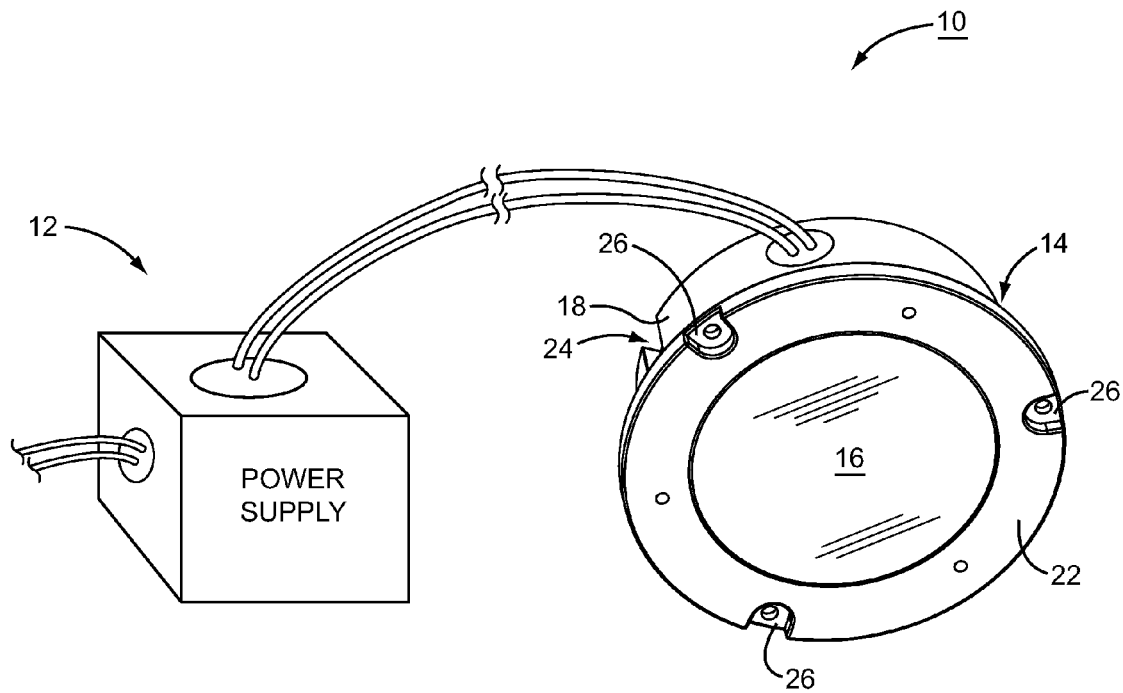
FIG. 1 is an isometric view of the front of an exemplary lighting device and power supply according to one embodiment of how the disclosure may be implemented.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art, and will not be interpreted in an idealized or overly formal sense unless expressly so defined herein.

The disclosure relates to a lighting fixture, which includes an array of solid-state light sources that are configured to generate light for general illumination lighting purposes and control circuitry. A drive signal is used to drive solid-state light sources. The control circuitry is configured to use a control output to control the drive signal to at least one of the solid-state light sources. The control output is configured to control the drive signal to 1) set at least one characteristic of the light generated by the array of the solid-state light sources, and 2) modulate the light with data for transmission. The light is modulated such that any change in the at least one characteristic based on the light being modulated is anthropically imperceptible. The characteristic of the light generated by the array of solid-state light sources may include the intensity, color, color temperature and the like.

The solid-state lighting sources may be light emitting diodes (LEDs). The array of solid-state lighting sources may include one or more strings of LEDs. As such, the drive current to all of the LEDs in the array or a subset of the LEDs in the array may be controlled to help set the characteristic of the light for the entire array. The LEDs may be arranged in one or more strings wherein the subset of LEDs is in one string or spread among multiple strings. The array or the subset of LEDs may include LEDs of the same color or different colors.

The control output may be one or more pulse-width modulated (PWM) signals, which can vary in frequency (period) and duty cycle. In one embodiment, the duty cycle of the PWM signal(s) is used to control the characteristic of the light. The frequency of the PWM signal(s) may can be varied to modulate the light. To maintain a characteristic of the light while the PWM signal is changing frequencies while modulating the light or between transmission states, the duty cycle of the PWM signal is kept constant. Keeping the duty cycle constant effectively maintains an average amount of drive current flowing through the array of LEDs, and thus, avoids perceptible changes in the light during modulation.

Figure 2:
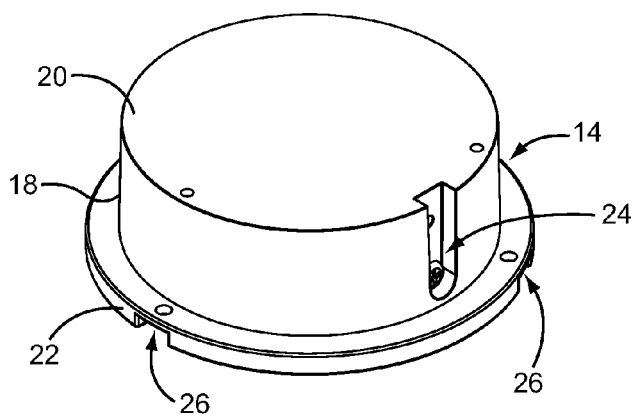
FIG. 2 is an isometric view of the back of the lighting device of FIG. 1.

FIG. 1 and FIG. 2 illustrate one embodiment of a unique lighting fixture 10 operably associated with one embodiment of a power supply 12. While this particular lighting fixture 10 is used for reference, those skilled in the art will recognize that virtually any type of solid-state lighting fixture may benefit from the subject disclosure. The lighting fixture 10 includes a mounting structure 14 and a lens 16. The illustrated mounting structure 14 is cup-shaped and is capable of acting as a heat-spreading device; however, different lighting fixtures may include different mounting structures 14 that may or may not act as heat-spreading devices. A light source (not shown), which will be described in further detail below, is mounted inside the mounting structure 14 and oriented such that light is emitted from the mounting structure 14 through the lens 16. Electronics (not shown) that are required to drive the light source are described further below. The power supply 12 is typically coupled to an alternating current (AC) source and used to provide power to the electronics of the lighting fixture 10. While the lighting fixture 10 is envisioned to be used predominantly in 4-, 5-, and 6-inch recessed lighting applications for industrial, commercial, and residential applications, those skilled in the art will recognize that the concepts disclosed herein are applicable to virtually any size and application.

The lens 16 may include one or more lenses that are made of clear or transparent materials, such as polycarbonate, acrylic glass, or any other suitable material. As discussed further below, the lens 16 may be associated with a diffuser for diffusing the light emanating from the light source and exiting the mounting structure 14 via the lens 16. Further, the lens 16 may also be configured to shape or direct the light exiting the mounting structure 14 via the lens 16 in a desired manner.

The power supply 12 and the lighting fixture 10 may be modular, wherein different sizes, shapes, and types of power supplies 12 may be connected or otherwise coupled to the mounting structure 14 of the lighting fixture 10 using an appropriate wiring harness. While shown as being physically separate, the power supply 12 and the lighting fixture 10 may be integrated to form a single structure.

In the illustrated embodiment, the mounting structure 14 is cup-shaped and includes a sidewall 18 that extends between a bottom panel 20 at the rear of the mounting structure 14 and a rim, which may be provided by an annular flange 22 at the front of the mounting structure 14. One or more elongated slots 24 may be formed in the outside surface of the sidewall 18. There are two elongated slots 24, which extend parallel to a central axis of the lighting fixture 10 from the rear surface of the bottom panel 20 toward, but not completely to, the annular flange 22. The elongated slots 24 may be used for a variety of purposes, such as providing a channel for a grounding wire that is connected to the mounting structure 14 inside the elongated slot 24, connecting additional elements to the lighting fixture 10, or, as described further below, securely attaching the lens 16 to the mounting structure 14.

The annular flange 22 may include one or more mounting recesses 26 in which mounting holes are provided. The mounting holes may be used for mounting the lighting fixture 10 to a mounting structure or for mounting accessories to the lighting fixture 10. The mounting recesses 26 provide for counter-sinking the heads of bolts, screws, or other attachment means below or into the front surface of the annular flange 22.

Figure 3A:
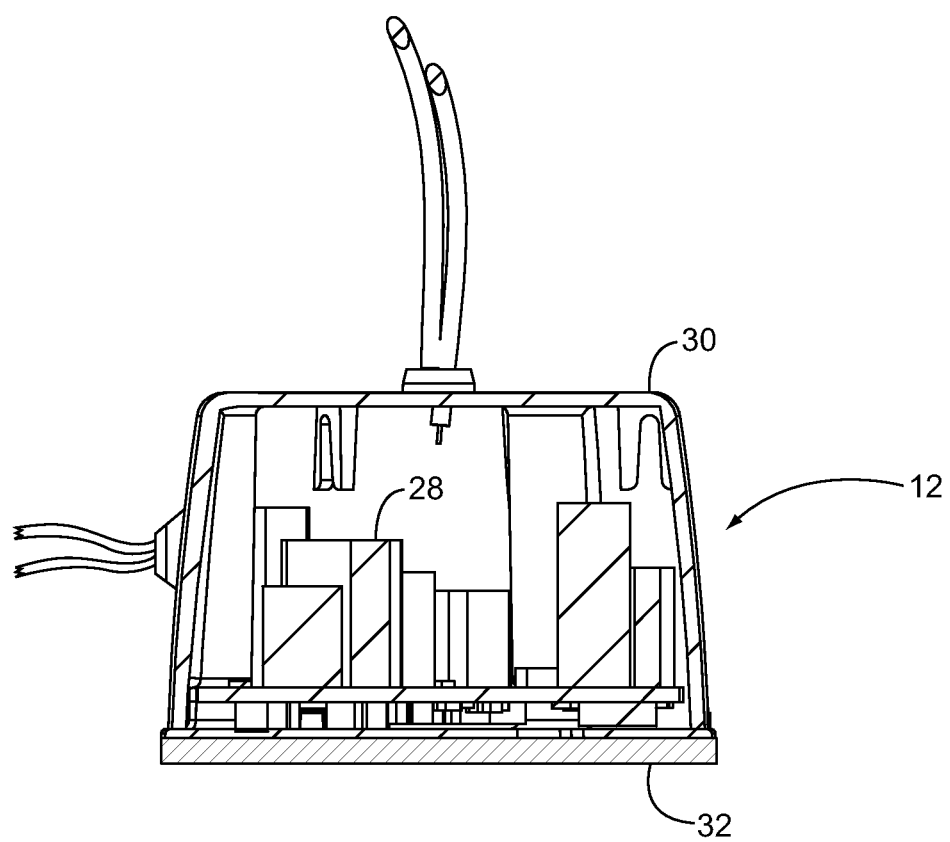
FIG. 3A is cross-sectional view of the power supply of FIG. 1.

With reference to FIG. 3A, a cross-sectional view of the power supply 12 of FIG. 1 is provided. As illustrated, the power supply 12 includes power supply electronics 28, which are encapsulated by a power supply housing 30 and a power supply cover 32. The power supply housing 30 is cup-shaped and sized sufficiently to receive the power supply electronics 28. The power supply cover 32 provides a cover that extends substantially over the opening of the power supply housing 30. Once the power supply cover 32 is in place, the power supply electronics 28 are contained within the power supply housing 30 and the power supply cover 32. The power supply electronics 28 may be used to provide power and potentially certain control signals necessary to power and control a light source module of the lighting fixture 10.

Figure 3B:
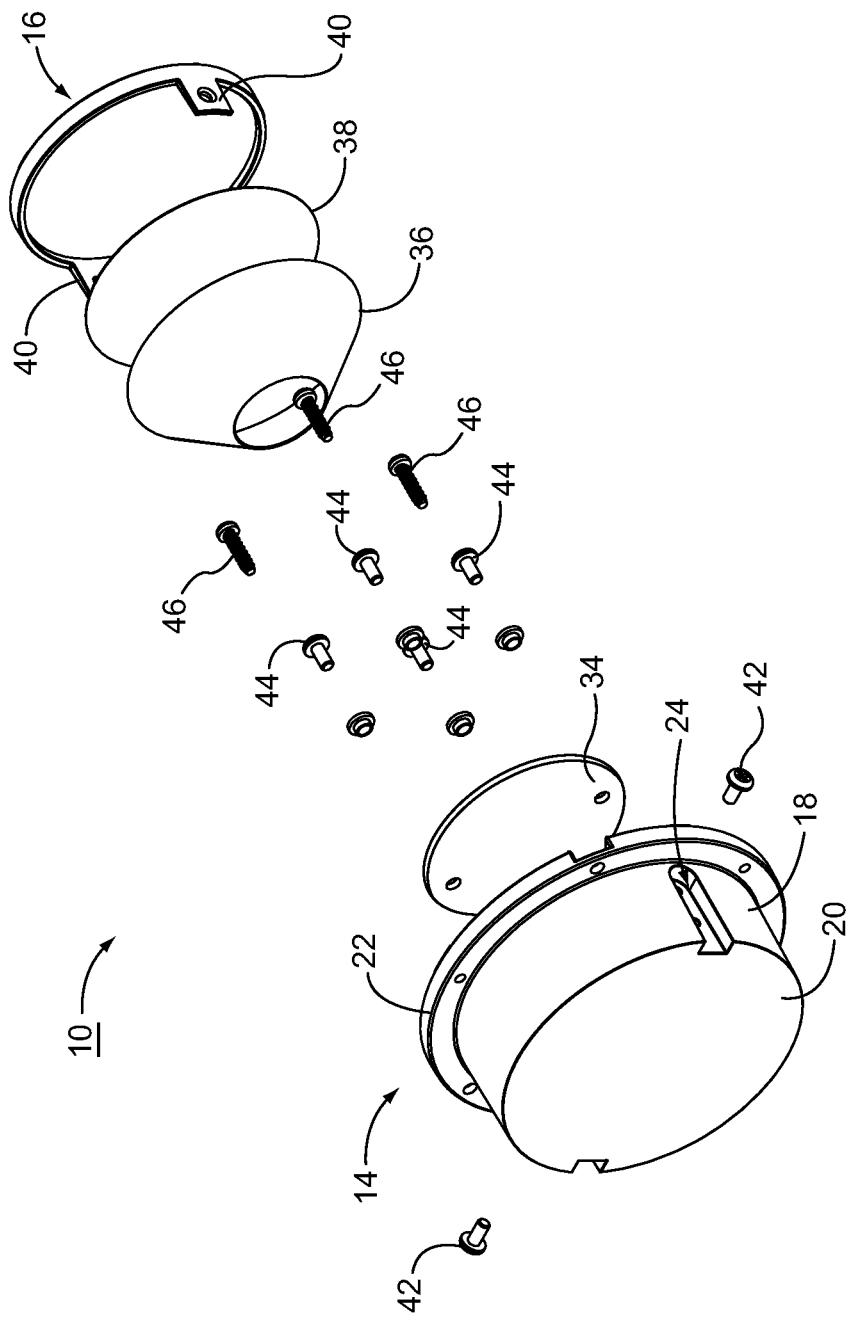
FIG. 3B is an exploded isometric view of the lighting device of FIG. 1.

With reference to FIG. 3B, the back of a light source module 34 is illustrated within an exploded view of the lighting fixture 10. The light source module 34 may be mounted on the front surface of the bottom panel 20 of the mounting structure 14 as shown, or in an aperture provided in the bottom panel 20 (not shown). Aligned holes or openings in the bottom panel 20 of the mounting structure 14 and the power supply cover 32 are provided to facilitate an electrical connection between the power supply electronics 28 in the power supply 12 and the light source module 34 of the lighting fixture 10.

In the illustrated embodiment, the light source module 34 employs light-emitting diodes (LEDs) and associated control electronics, which are generally mounted to a printed circuit board (PCB). Among other functions, the control electronics are configured to drive the LEDs to generate light at a desired color, intensity, and color temperature. Detailed operation of the light source module 34 is provided further below. The control electronics and LEDs are shown mounted on the front side of the PCB, while the rear side of the PCB is mounted to the front surface of the bottom panel 20 of the mounting structure 14 directly or via a thermally conductive pad (not shown). In this embodiment, the thermally conductive pad has a low thermal resistivity, and therefore, efficiently transfers heat that is generated by the light source module 34 to the bottom panel 20 of the mounting structure 14.

While various mounting mechanisms are available, the illustrated embodiment employs four bolts 44 to attach the PCB of the light source module 34 to the front surface of the bottom panel 20 of the mounting structure 14. The bolts 44 screw into threaded holes provided in the front surface of the bottom panel 20 of the mounting structure 14. Notably, the shape of the PCB is shown as being circular, but the shape may be rectangular, square, oval, polygonal, or the like.

A reflector cone 36 resides within the interior chamber provided by the mounting structure 14. In the illustrated embodiment, the reflector cone 36 has a conical wall that extends between a larger front opening and a smaller rear opening. The larger front opening resides at and substantially corresponds to the dimensions of front opening in the mounting structure 14 that corresponds to the front of the interior chamber provided by the mounting structure 14. The smaller rear opening of the reflector cone 36 resides at and substantially corresponds to the size of the LED or array of LEDs provided by the light source module 34. The front surface of the reflector cone 36 is generally, but not necessarily, highly reflective in an effort to increase the overall efficiency and optical performance of the lighting fixture 10. In certain embodiments, the reflector cone 36 is formed from metal, paper, a polymer, or a combination thereof. In essence, the reflector cone 36 provides a mixing chamber for light emitted from the light source module 34, and may be used to help direct or control how the light exits the mixing chamber through the lens 16.

Figure 4:
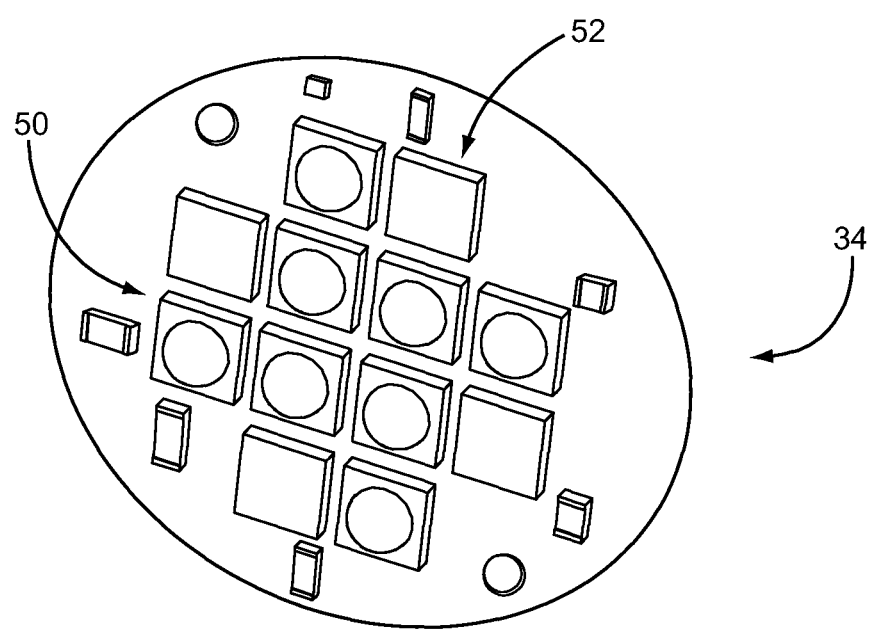
FIG. 4 illustrates one embodiment of a light source module for light-emitting diode (LED)-based applications.
Figure 5:
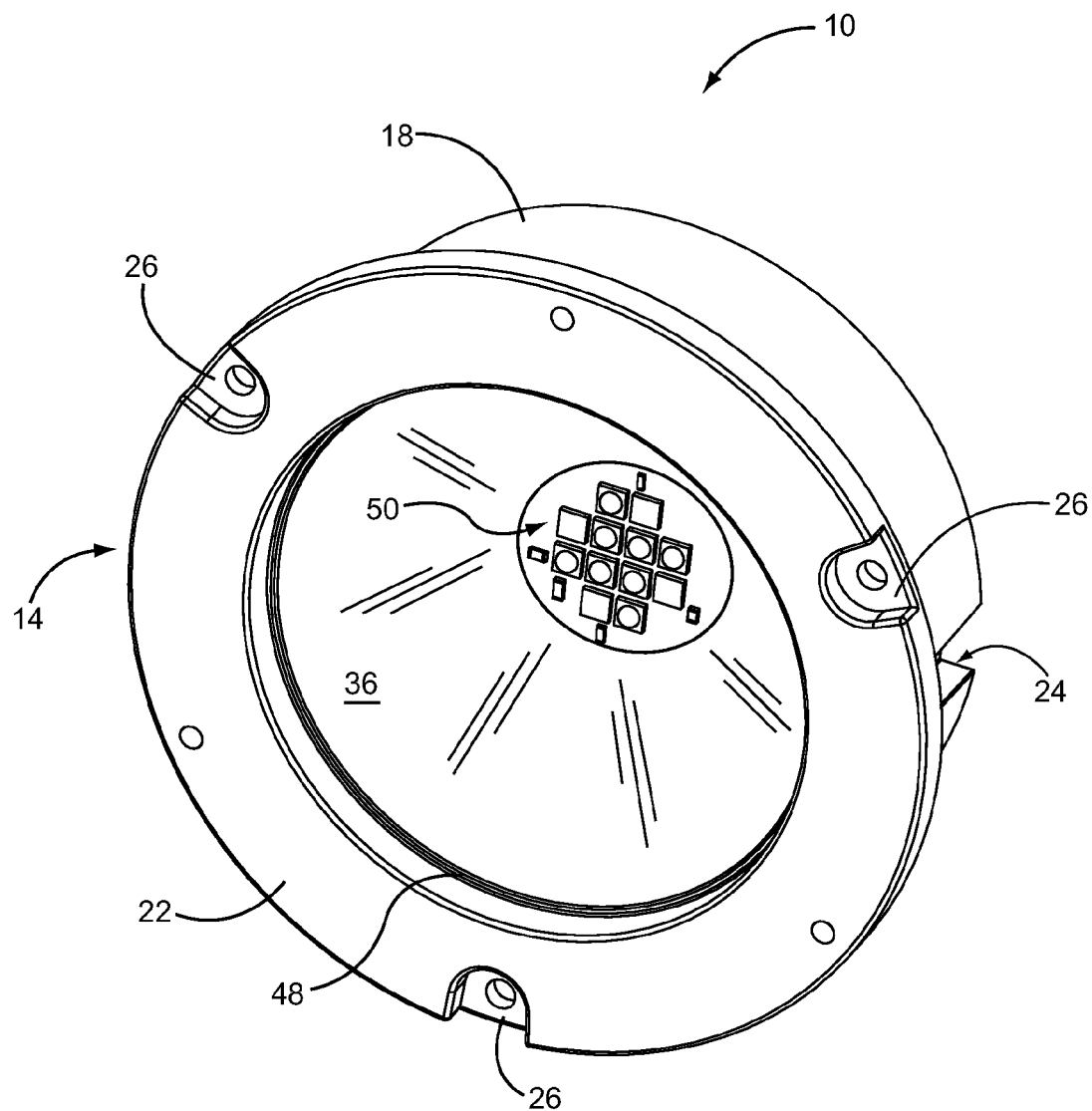
FIG. 5 is an isometric view of the front of the lighting device of FIG. 1 without the lens and diffuser.

When assembled, the lens 16 is mounted on or over the annular flange 22 and may be used to hold the reflector cone 36 in place within the interior chamber of the mounting structure 14, as well as to hold additional lenses and one or more planar diffusers 38 in place. In the illustrated embodiment, the lens 16 and the diffuser 38 generally correspond in shape and size to the front opening of the mounting structure 14 and are mounted such that the front surface of the lens 16 is substantially flush with the front surface of the annular flange 22. As shown in FIGS. 4 and 5, a recess 48 is provided on the interior surface of the sidewall 18 and substantially around the opening of the mounting structure 14. The recess 48 provides a ledge on which the diffuser 38 and the lens 16 rest inside the mounting structure 14. The recess 48 may be sufficiently deep such that the front surface of the lens 16 is flush with the front surface of the annular flange 22.

Returning to FIG. 3B, the lens 16 may include tabs 40, which extend rearward from the outer periphery of the lens 16. The tabs 40 may slide into corresponding channels on the interior surface of the sidewall 18 (see FIG. 4). The channels are aligned with the corresponding elongated slots 24 on the exterior of the sidewall 18. The tabs 40 have threaded holes that align with holes provided in the grooves of the elongated slots 24. When the lens 16 resides in the recess 48 at the front opening of the mounting structure 14, the holes in the tabs 40 will align with the holes in the elongated slots 24. Bolts 42 may be inserted through the holes in the elongated slots 24 and screwed into the holes provided in the tabs 40 to affix the lens 16 to the mounting structure 14. When the lens 16 is secured, the diffuser 38 is sandwiched between the lens 16 and the recess 48, and the reflector cone 36 is contained between the diffuser 38 and the light source module 34. Alternatively, a retention ring (not shown) may attach to the annular flange 22 of the mounting structure 14 and operate to hold the lens 16 and the diffuser 38 in place.

The degree and type of diffusion provided by the diffuser 38 may vary from one embodiment to another. Further, color, translucency, or opaqueness of the diffuser 38 may vary from one embodiment to another. A separate diffuser 38, such as that illustrated in FIG. 3B, is typically formed from a polymer, a glass, or a thermoplastic, but other materials are viable and will be appreciated by those skilled in the art. Similarly, the lens 16 is planar and generally corresponds to the shape and size of the diffuser 38 as well as the front opening of the mounting structure 14. As with the diffuser 38, the material, color, translucency, or opaqueness of the lens 16 may vary from one embodiment to another. Further, both the diffuser 38 and the lens 16 may be formed from one or more materials or one or more layers of the same or different materials. While only one diffuser 38 and one lens 16 are depicted, the lighting fixture 10 may have multiple diffusers 38 and/or lenses 16.

FIG. 4 illustrates one embodiment of the light source module 34 for LED-based applications, wherein the light source module 34 provides an LED array of LEDs 50 and a driver module 52. The LED array of LEDs 50 is configured to generate light for general illumination. In this embodiment, the driver module 52 drives the LEDs 50 in the LED array by transferring power from the power supply 12 (shown in FIG. 1) to the LEDs 50. The LEDs 50 in the LED array emit light in response to the electrical signals generated by the driver module 52. In this embodiment, the electrical signals modulate one or more drive signals to the LEDs 50, such as one or more drive currents and/or drive voltages. For example, a single drive current may be generated or multiple drive currents may be generated. When only the single drive current is generated, the drive current is provided through all of the LEDs 50. The drive current itself may be modulated so that the drive current through all of the LEDs 50 is modulated. In contrast, the drive current may be substantially a DC current. However, if the drive current is substantially a DC current, the drive current though one or more of the LEDs 50 can be modulated by setting when and for how long the drive current is provided through one or more of the LEDs 50. If multiple drive currents are generated, then different sets of one or more of the LEDs 50 in the LED array may be provided with a particular one of the drive currents. In this case, different drive currents may be provided to varying sets of the LEDs 50. Each, some, or none of the drive currents may be modulated, and the drive current through any combination of the LEDs 50 may be modulated by modulating the drive current itself and/or by setting when and for how long the drive current is provided through combinations of one or more of the LEDs 50.

In response to the drive current through the LED 50, the LED 50 generates a light output. By controlling the drive current(s) through the LEDs, the driver module 52 provides lighting control functionality. More specifically, the driver module 52 provides lighting control functionality by adjusting the drive current or drive currents through the LEDs 50. For example, the driver program code may direct the operations of the driver module 52 to adjust the drive current to at least one LED 50 so as to set a dimming level of the LEDs 50, to set a color temperature of the LEDs 50, and/or to turn the LEDs 50 on and off.

Additionally, the driver module 52 is configured to communicate information through the light output emitted by one or more of the LEDs 50. In particular, the driver module 52 modulates the drive current through at least one of the LEDs 50 in accordance with data bits, such that a light output from at least one of the LEDs 50 carries a data bit representation of the data bits. However, the drive current though the LEDs 50 may be modulated by driver module 56 such that the data bit representation carried by the light is anthropically imperceptible. As such, information (i.e., the data bits) can be communicated inconspicuously through the light emitted by the LEDs 50 in the LED array.

The LED array may include a group of blue-shifted yellow (BSY) LEDs 50, a group of blue-shifted green (BSG) LEDs 50, and a group of red LEDs 50. BSY LEDs 50 emit bluish light, and the wavelength conversion material is a yellow phosphor that absorbs the blue light and emits yellowish light. Even if some of the bluish light passes through the phosphor, the resultant mix of light emitted from the overall BSY LED 50 is yellowish light. The ratio of the green, yellow, and red light regulated by the control output produces light at a particular color temperature. The yellowish light emitted from a BSY LED 50 has a color point that falls above a Black Body Locus (BBL) on the 1931 International Commission on Illumination (CIE) chromaticity diagram, wherein the BBL corresponds to the various color temperatures of the light.

FIG. 5 illustrates a front isometric view of the lighting fixture 10 with the lens 16 and the diffuser 38 removed and the reflector cone 36 in place, such that the array of LEDs 50 of the light source module 34 is aligned with the rear opening of the reflector cone 36. As noted above, the volume inside the reflector cone 36 and bounded by the rear opening of the reflector cone 36 and the lens 16 or the diffuser 38 provides a mixing chamber.

Light emitted from the array of LEDs 50 is mixed inside the mixing chamber formed by the reflector cone 36 and directed out through the lens 16 in a forward direction to form a light beam. The array of LEDs 50 of the light source module 34 may include LEDs 50 that emit different colors of light. For example, the array of LEDs 50 may include both red LEDs that emit reddish light and BSY LEDs 50 that emit bluish-yellow light or BSG LEDs 50 that emit bluish-green light, wherein the red and bluish-yellow or bluish-green light is mixed to form light at a desired color temperature, such as "white" light. In certain embodiments, the array of LEDs 50 may include a large number of red LEDs 50 and BSY or BSG LEDs 50 in various ratios. For example, two or three BSY or BSG LEDs 50 may be associated with each red LED 50, and the total number of LEDs 50 may be 10, 25, 50, 100, or more, depending on the application. For clarity, FIGS. 4, 5, and 6 only show twelve LEDs in the array of LEDs 50.

For a uniformly colored beam, relatively thorough mixing of the light output from the LEDs 50 in the array of LEDs 50 is desired. Both the reflector cone 36 and the diffusion provided by the diffuser 38 play significant roles in mixing the light outputs emanated from the array of LEDs 50 of the light source module 34. In particular, certain light outputs, which are referred to as non-reflected light outputs, emanate from the array of LEDs 50 and exit the mixing chamber through the diffuser 38 and the lens 16 without being reflected off of the interior surface of the reflector cone 36. Other light rays, which are referred to as reflected light outputs, emanate from the array of LEDs 50 of the light source module 34 and are reflected off of the front surface of the reflector cone 36 one or more times before exiting the mixing chamber through the diffuser 38 and the lens 16. With these reflections, the reflected light outputs are effectively mixed with each other and at least some of the non-reflected light outputs within the mixing chamber before exiting the mixing chamber through the diffuser 38 and the lens 16.

As noted above, the diffuser 38 functions to diffuse, and as a result, mix, the non-reflected and reflected light outputs as they exit the mixing chamber, wherein the mixing chamber and the diffuser 38 provide the desired mixing of the light outputs emanated from the array of LEDs 50 of the light source module 34 to provide light of a consistent and desired color. In addition to mixing light outputs, the lens 16 and the diffuser 38 may be designed and the reflector cone 36 may be shaped in a manner to control the relative concentration and shape of the resulting light beam that is projected from the lighting fixture 10. For example, a first lighting fixture 10 may be designed to provide a concentrated beam for a spotlight, wherein another lighting fixture 10 may be designed to provide a widely dispersed beam for a floodlight. From an aesthetics perspective, the diffusion provided by the diffuser 38 also prevents the emitted light from looking pixilated and obstructs the ability for a user to see the individual LEDs 50 of the array of LEDs 50.

Figure 6:
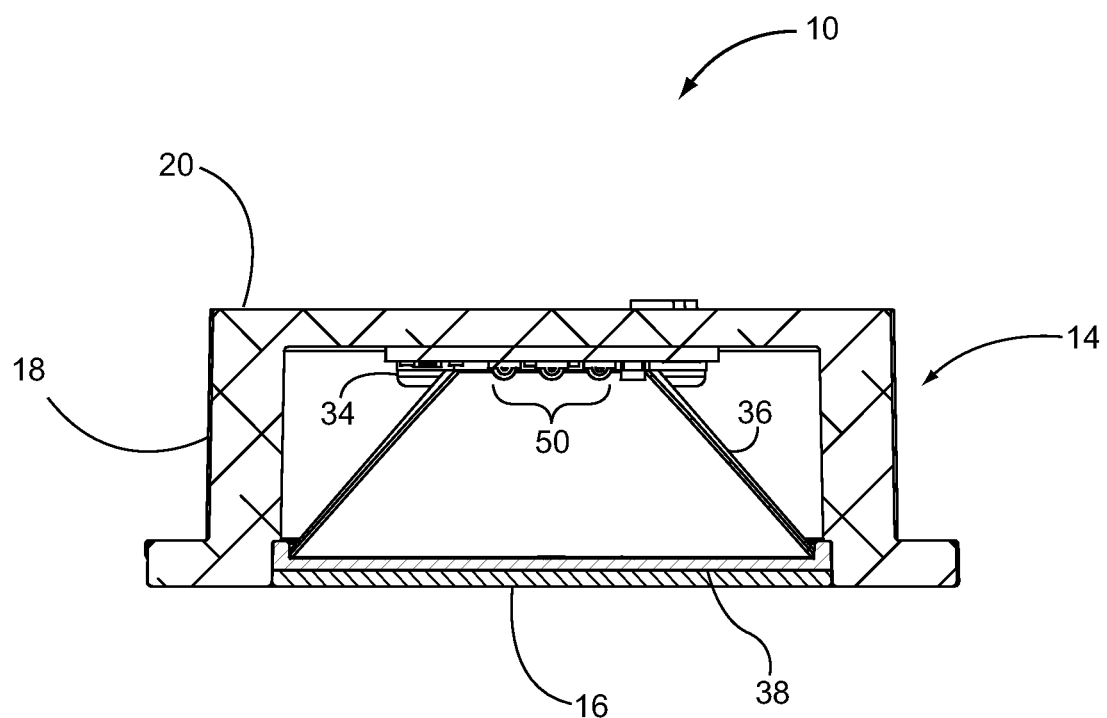
FIG. 6 is a cross-sectional view of the lighting device of FIG. 5.

As provided in the above embodiment, the more traditional approach to diffusion is to provide a diffuser 38 that is separate from the lens 16. As such, the lens 16 is effectively transparent and does not add any intentional diffusion. The intentional diffusion is provided by the diffuser 38. In most instances, the diffuser 38 and the lens 16 are positioned next to one another, as shown in FIG. 6. However, in other embodiments, the diffusion may be integrated into the lens 16 itself.

Figure 7:
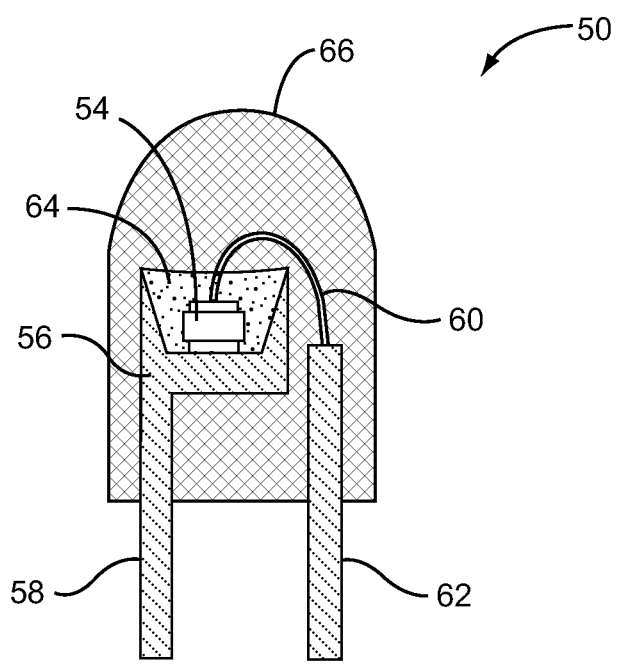
FIG. 7 is a cross-sectional view of a first type of LED architecture.

A traditional package for an LED 50 of the array of LEDs 50 is illustrated in FIG. 7. A single LED chip 54 is mounted on a reflective cup 56 using solder or a conductive epoxy, such that ohmic contacts for a cathode (or an anode) of the LED chip 54 are electrically coupled to the bottom of the reflective cup 56. The reflective cup 56 is either coupled to or integrally formed with a first lead 58 of the LED 50. One or more bond wires 60 connect ohmic contacts for the anode (or the cathode) of the LED chip 54 to a second lead 62.

The reflective cup 56 may be filled with an encapsulant material 64 that encapsulates the LED chip 54. The encapsulant material 64 may be transparent or may contain a wavelength conversion material, such as a phosphor, which is described in greater detail below. The entire assembly is encapsulated in a transparent protective resin 66, which may be molded in the shape of a lens 16 to control the light emitted from the LED chip 54.

Figure 8:
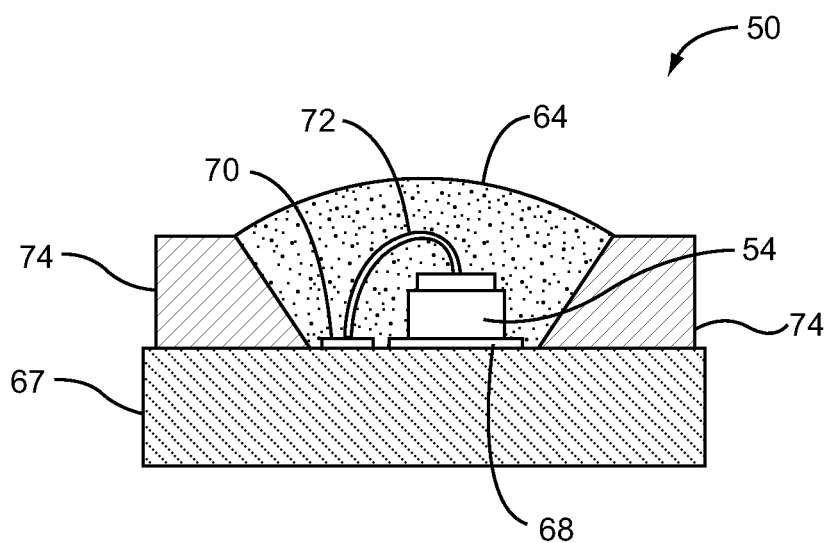
FIG. 8 is a cross-sectional view of a second type of LED architecture.

FIG. 8 illustrates another embodiment of the LED 50. An alternative package for an LED 50 is also illustrated in FIG. 8, wherein the LED chip 54 is mounted on a substrate 67. In particular, the ohmic contacts for the anode (or the cathode) of the LED chip 54 are directly mounted to first contact pads 68 on the surface of the substrate 67. The ohmic contacts for the cathode (or the anode) of the LED chip 54 are connected to second contact pads 70, which are also located on the surface of the substrate 67, using bond wires 72. The LED chip 54 resides in a cavity of a reflector structure 74, which is formed from a reflective material and functions to reflect light emitted from the LED chip 54 through the opening formed by the reflector structure 74. The cavity formed by the reflector structure 74 may be filled with an encapsulant material 64 that encapsulates the LED chip 54. The encapsulant material 64 may be transparent or may contain a wavelength conversion material, such as a phosphor.

In either of the embodiments of FIGS. 7 and 8, if the encapsulant material 64 is transparent, the light emitted by the LED chip 54 passes through the encapsulant material 64 and the protective resin 66 without any substantial shift in color. As such, the light emitted from the LED chip 54 is effectively the light emitted from the LED 50. If the encapsulant material 64 contains a wavelength conversion material, substantially all or a portion of the light emitted by the LED chip 54 in a first wavelength range may be absorbed by the wavelength conversion material, which will responsively emit light in a second wavelength range. The concentration and type of wavelength conversion material will dictate how much of the light emitted by the LED chip 54 is absorbed by the wavelength conversion material as well as the extent of the wavelength conversion. In embodiments where some of the light emitted by the LED chip 54 passes through the wavelength conversion material without being absorbed, the light passing through the wavelength conversion material will mix with the light emitted by the wavelength conversion material. Thus, when a wavelength conversion material is used, the light emitted from the LED 50 is shifted in color from the actual light emitted from the LED chip 54.

As noted above, the array of LEDs 50 may include a group of BSY or BSG LEDs 50 as well as a group of red LEDs 50. BSY LEDs 50 include an LED chip 54 that emits bluish light, and the wavelength conversion material is a yellow phosphor that absorbs the blue light and emits yellowish light. Even if some of the bluish light passes through the phosphor, the resultant mix of light emitted from the overall BSY LED 50 is yellowish light. The yellowish light emitted from a BSY LED 50 has a color point that typically falls above the BBL on the 1931 CIE chromaticity diagram, wherein the BBL corresponds to the various color temperatures of white light.

Similarly, BSG LEDs 50 include an LED chip 54 that emits bluish light; however, the wavelength conversion material is a greenish phosphor that absorbs the blue light and emits greenish light. Even if some of the bluish light passes through the phosphor, the resultant mix of light emitted from the overall BSG LED 50 is greenish light. The greenish light emitted from a BSG LED 50 typically has a color point that also falls above the BBL on the 1931 CIE chromaticity diagram, wherein the BBL corresponds to the various color temperatures of white light.

The red LEDs 50 generally emit reddish light at a color point on the opposite side of the BBL (or below) as the yellowish or greenish light of the BSY or BSG LEDs 50. As such, the reddish light from the red LEDs 50 mixes with the yellowish or greenish light emitted from the BSY or BSG LEDs 50 to generate white light that has a desired color temperature and falls within a desired proximity of the BBL. In effect, the reddish light from the red LEDs 50 pulls the yellowish or greenish light from the BSY or BSG LEDs 50 to a desired color point on or near the BBL. Notably, the red LEDs 50 may have LED chips 54 that natively emit reddish light when no wavelength conversion material is employed. Alternatively, the LED chips 54 may be associated with a wavelength conversion material, wherein the resultant light emitted from the wavelength conversion material and any light that is emitted from the LED chips 54 without being absorbed by the wavelength conversion material mixes to form the desired reddish light.

The blue LED chip 54 used to form either the BSY or BSG LEDs 50 may be formed from a gallium nitride (GaN), indium gallium nitride (InGaN), silicon carbide (SiC), zinc selenide (ZnSe), or like material system. The red LED chip 54 may be formed from an aluminum indium gallium nitride (AlInGaN), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, lutetium aluminum garnet (LuAg), cerium-doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and material systems that are applicable to the concepts disclosed herein. As noted, the array of LEDs 50 on the light source module 34 may include a mixture of red LEDs 50 and either BSY or BSG LEDs 50. Alternatively, the LED array may only have LEDs 50 of a single color, such as for example, blue-shifted white (BSW).

Figure 9:
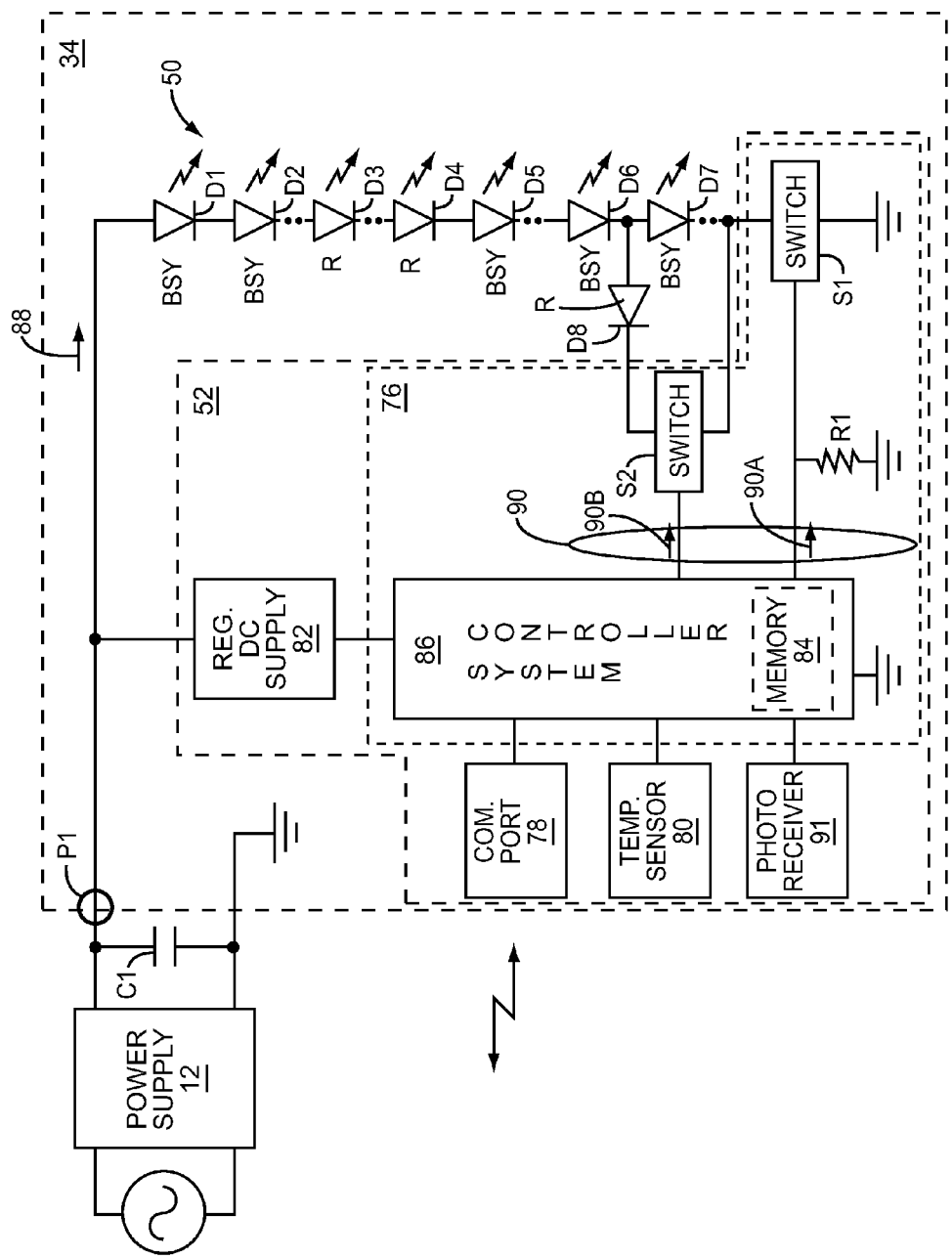
FIG. 9 is a schematic of the exemplary light source module for a lighting fixture, wherein the light source module includes an array of LEDs and a driver module configured to control a drive current to the array of LEDs.

FIG. 9 illustrates one embodiment of the light source module 34 including one embodiment of the driver module 52 and one embodiment of the array of LEDs 50. As illustrated in FIG. 9, the light source module 34 may also include a variety of control electronics, such as control circuitry 76, a communication port 78, a temperature sensor 80, and a regulated direct current (DC) supply 82. The control circuitry 76 in FIG. 9 includes memory 84, a system controller 86, switch S1, and switch S2. In this embodiment, the memory 84 is internal to the system controller 86.

The memory 84 is configured to store the driver program code and the system controller 86 is configured to execute the driver program code. The driver program code causes the system controller 86 to control a drive current 88 to the LEDs 50. The driver module 52 is operable to drive the LEDs 50, wherein each of the LEDs 50 is responsive to generate a light output in response to the drive current 88 through the LED 50. The light output from each of the LEDs 50 is mixed by the mixing chamber to provide the light from the LEDs 50 in the LED array. By controlling the drive current 88 through the LEDs 50, the system controller 86 is operable to control the light output from the LEDs 50 and provide lighting control functionality. In this embodiment, the system controller 86 generates a control output 90 that is operable to switch the switches S1 and S2. As explained in further detail below, the control output 90 is configured to modulate the light with data for transmission such that any change in the at least one characteristic based on the light being modulated is anthropically imperceptible. In this particular embodiment, the control output 90 includes a control output signal 90A, and a control output signal 90B.

The control circuitry 76 is configured to control the drive current 88 to at least one of the LEDs 50 with the control output 90. The control output 90 is configured to set at least one characteristic of the light provided by the LED array of the LEDs 50. In this embodiment, the control circuitry 76 is configured to control the drive current 88 to a subset of the LEDs 50, wherein the subset of the LEDs 50 is the LED D7 and the LED D8. The subset of the LED D7 and the LED D8 is a is a proper subset of the LEDs 50 in the LED array because not every one of the LEDs 50 in the LED array is contained in the subset of the LED D7 and the LED D8.

The control circuitry 76 is configured to control a luminous flux of the light output emitted from the LED D8 and the LED D7 in the LED array such that the luminous flux of the light output from the LED D7 and the LED D8 varies to define luminous flux pulses. The luminous flux is the power emitted from a light source in all directions based on a luminosity function. The luminosity function factors in anthropic sensitivity. As such, the power relevant to the luminous flux is the power of electromagnetic emissions that are in the anthropically observable (i.e., visible) portion of the electromagnetic spectrum. The luminosity function may be any suitable luminosity function, and thus may depend on a particular lighting application. For example, CIE has defined a photopic luminosity function based on normal light levels and a scotopic luminosity function for poor light levels. One exemplary measurement unit for luminous flux is a lumen (lm).

Referring again to FIG. 9, the LED D8 is activated during each of the luminous flux pulses of the light output from the LED D8, but the LED D8 is deactivated outside the luminous flux pulses of the light output from the LED D8. Additionally, the LED D7 is activated during each of the luminous flux pulses of the light output from the LED D7, but the LED D7 is deactivated outside the luminous flux pulses of the light output from the LED D7.

The switches S1, S2 in the control circuitry 76 coordinate the flow of the drive current 88 within the LED array of the LEDs 50. Since each of the LEDs 50 converts electrical energy from the drive current 88 into its respective light output, controlling the drive current 88 through the LEDs 50 thus controls the luminous flux of the light outputs. The control output 90 thus regulates the luminous flux of the light outputs from each of the LEDs 50 in the LED array. Using modulation schemes, the control output 90 is configured to modulate the light with data for transmission such that any change in the at least one characteristic based on the light being modulated is anthropically imperceptible.

As shown in FIG. 9, the switch S1 in the control circuitry 76 is coupled to receive the control output signal 90A from the system controller 86. The switch S1 is switched to an open state from a closed state and from the closed state to the open state in accordance with a control output signal level of the control output signal 90A. In this embodiment, the drive current 88 is prevented from going through all of the LEDs 50 when the switch S1 is in the open state. Additionally, the drive current 88 goes through at least the LEDs D1-D6 when the switch S1 is in the closed state. The LEDs D1-D6 thus each provides a light output when the switch S1 is in the closed state. Accordingly, the array of LEDs 50 can be turned off when the switch S1 is in the open state and turned on when the switch S1 is in the closed state.

The control circuitry 76 is adapted to control the drive current 88 to the LED D7 and the LED D8 with the control output 90. More specifically, the control circuitry 76 controls the drive current 88 through the LED D7 with the control output signal 90B of the control output 90. The control circuitry 76 also controls the drive current 88 through the LED D8 with the control output signal 90B of the control output 90. As such, the control circuitry 76 is adapted to control the luminous flux of the light output of the LED D7 with the control output signal 90B and to control the luminous flux of the light output of the LED D8 with the control output signal 90B. As shown in FIG. 9, the switch S2 in the control circuitry 76 is coupled to receive the control output signal 90B from the system controller 86. The switch S2 is switched to an open state from a closed state and from the closed state to the open state in accordance with a control output signal level of the control output signal 90B. While the switch S1 is in the closed state, the drive current 88 is prevented from going through the LED D8 when the switch S2 is in the open state. Additionally, the drive current 88 goes through the LED D8 when the switch S1 is in the closed state and when the switch S2 is in the closed state. The LED D8 thus provides a light output when the switch S1 is in the closed state and when the switch S2 is in the closed state. Accordingly, the LED D8 can be deactivated when the switch S1 is in the closed state by providing the switch S2 in the open state. In summary, the drive current 88 goes through the string of LEDs D1-D7, but does not go through the LED D8 when the switch S1 is in the closed state and the switch S2 is in the open state. Thus, so long as the switch S1 is in the closed state and the switch S2 is in the open state, the LED D7, which is BSY, emits a light output (along with the light outputs of the other LEDs D1-D6). As a result, the LEDs 50 are configured such that the LED D8 is deactivated and the LED D7 (along with the other LEDs D1-D6) is activated when the switch S1 is in the closed state and the switch S2 is in the open state.

The control output signal 90B is a pulsed signal, and more specifically a pulsed voltage that opens and closes the switch S2. As a result, the drive current 88 is provided through the LED D8 in pulses. Therefore, the luminous flux of the light output from the LED D8 varies to generate luminous flux pulses. Similarly, the drive current 88 is also provided through the LED D7 in pulses. Therefore, the luminous flux of the light output from the LED D8 also varies to generate luminous flux pulses. Since the LED D8 is activated when the LED D7 is deactivated and vice versa, the luminous flux pulses from the light output from the LED D8 and the luminous flux pulses from the light output from the LED D7 are synchronized and have the same pulse frequency. However, a duty cycle of the luminous flux pulses of the light output from the LED D7 are equal to one (1) minus a duty cycle of the luminous flux pulses of the light output from the LED D8. Also, the luminous flux pulses of the light output from the LED D7 occur during opposite temporal portions of the luminous flux pulses of the light output from the LED D8 in a pulse cycle.

In this embodiment, the driver program code in the memory 84 causes the system controller 86 to generate the control output 90. The control output 90 is configured to modulate the light with data for transmission such that any change in the at least one characteristic based on the light being modulated is anthropically imperceptible. As shown in FIG. 9, the switch S1 and the switch S2 are each responsive to the control output 90 from the system controller 86 so as to be switched to and from the open state and the closed state. As such, the system controller 86 is configured to coordinate the switching of the switch S1 and the switch S2 by generating the control output 90. More specifically, the switch S1 is coupled to receive the control output signal 90A from the system controller 86. When the driver program code causes the system controller 86 to set the control signal level of the control output signal 90A to greater than an activation signal level, the switch S1 is set to the closed state. On the other hand, when the driver program code causes the control signal level of the control output signal 90A to be less than the activation signal level, the switch S1 is set to the open state. With regard to the switch S2, the switch S2 is coupled to receive the control output signal 90B. When the driver program code causes the system controller 86 to set the control signal level of the control output signal 90B to greater than the activation signal level, the switch S2 is set to the closed state. On the other hand, when the driver program code causes the system controller 86 to set the control signal level of the control output signal 90B to less than the activation signal level, the switch S2 is set to the open state.

To control the light output from the LED D8, the switch S2 can be switched to and from the open state and the closed state while the switch S1 is maintained in the closed state. Note that the LED D7 is deactivated when the switch S2 is in the closed state because the LED D8 is coupled in shunt with the LED D7. As such, the LED D8 is coupled such that drive current 88 bypasses the LED D7 and goes through the LED D8 when the switch S1 is in the closed state and the switch S2 is in the closed state. Accordingly, the LEDs 50 are configured such that the LED D8 (along with the other LEDs D1-D6) is activated and the LED D7 is deactivated when the switch S1 is in the closed state and the switch S2 is in the closed state.

In this embodiment, the LED D8 is one of the red LEDs 50. By controlling the light output from the LED D8, the color temperature of the light from the LEDs 50 can be controlled by setting the appropriate ratio of the light output of red visible light from the LED D8, the light output of yellow visible light from the LED D7, and the other light outputs of the other LEDs D1-D6 from the LEDs 50. With regard LED D8 to the exemplary light source module 34 in FIG. 9, the other light outputs from of the other LEDs D1-D6 are each generated to with relatively a constant luminous flux. Rather, as explained above, the luminous flux of the light output from the LED D8 and the luminous flux of the light output from the LED D7 are varied with the control output signal 90B. Due to the mixing of the light provided from all of the LEDs 50 in the LED array, modulating the pulse width of the luminous flux pulses from each of the light outputs from the LED D7 and LED D8 sets the color temperature and the color of the light from the LEDs 50 in the LED array.

More specifically, the driver program code causes the system controller 86 to generate the control output signal 90B as a pulsed control output signal with pulses provided at a pulse frequency. During a pulse cycle defined by the pulse frequency of the control output signal 90B thus sets the pulse frequency of the luminous flux pulses of the light outputs from the LEDs D7 and LEDs D8. In this embodiment, the pulse frequency of the control output signal 90B and of both the luminous flux pulses of the light outputs from the LEDs D7 and LEDs D8 is the same. To modulate the pulse width of the luminous flux pulsed from the light outputs of the LEDs D7 and D8, the system controller 86 of the control circuitry 76 is configured to modulate the pulse width of the pulses in the control output signal 90B. During each pulse cycle, one of the pulses is provided in the control output signal 90B, which results in one of the luminous flux pulses from each of the light outputs from the LED D7 and LED D8. During each of the pulse cycles, the corresponding luminous flux pulse of the light output from the LED D8 is generated as a result of the presence of the pulse in the control output signal 90B. However, unlike the corresponding luminous flux pulse from the light output of the LED D8, the corresponding luminous flux pulse of the light output from the LED D7 is generated as a result of the absence of the pulse in the control output signal 90B.

The driver program code in the memory 84 causes the system controller 86 to modulate a pulse width of the pulses in the control output signal 90B. As a result, the light outputs from the LED7 and the LED8 are Pulse Width Modulated (PWM). In this embodiment, to generate each of the pulses in the control output signal 90B during each pulse cycle, the system controller, the control output signal level of the control output signal 90B is greater than the activation level. For the remainder of the pulse cycle, the control output signal 90B may be set below the activation level. As such, the drive current 88 goes through the LED D8 and bypasses the LED D7 as a result of each of the pulses in the control output signal 90B. On the other hand, the drive current 88 goes through the LED7 D7 but bypasses the LED D8 as a result of the termination of each of the pulses of the control output signal 90B. The system controller 86 is configured to adjust a duty cycle and thus temporal length of the pulses relative to a total time period of the pulse cycle. The drive current 88 is PWM pulse-width modulated through the LED7 and the LED8. Since the light outputs from all of the LEDs 50 are mixed, the light from the LEDs 50 in the array is also PWM. As a result, the LED D7 and the LED D8.

The control circuitry 76 is adapted to modulate the pulse width of the luminous flux pulses to set one or more characteristics of the light generated by the LED array of LEDs 50. Modulating the pulse widths of the luminous flux pulses of the light output of the LED D8 adjusts the duty cycle of the luminous flux pulses of the light output of the LED D8. Modulating the pulse widths of the luminous flux pulses of the light output of the LED D7 adjust the duty cycle of the luminous flux pulses of the light output of the LED D7. Since the light output from the LED D8 and the light output from the LED D7 are mixed as part of the light from the LEDs 50 in the LED array, modulating the pulse width of the luminous flux pulses of the light output of the LED D8 and adjusting the pulse width of the luminous flux pulses of the LED D7 set one or more characteristics of the light generated by the array of LEDs 50. Accordingly, the control output 90 is configured to set at least one characteristic of light provided by the LED array of the LEDs 50. In this particular embodiment, the control output 90 is configured to set the color and the color temperature of the light provided by the LED array of the LEDs 50 with the control output signal 90B of the control output 90.

More specifically, the ratio of pulse time to total time of a pulse cycle defines a duty cycle. In this embodiment, the duty cycle of the control output signal 90B directly sets the ratio between the light output from the LED D8, which is red, and the light output from the LED D7, which is BSY. The duty cycle is thus directly related to the ratio of the red light output and the BSY light output. The driver program code causes the system controller 86 to adjust the duty cycle of the control output signal 90B and thereby set the color temperature of the light emitted from the LEDs 50.

With regard to the system controller 86 shown in FIG. 9, the driver program code causes the system controller 86 to maintain the control signal level of the control output signal 90A above the activation level while the LEDs 50 are activated. In accordance with the driver program code, the control signal level of the control output signal 90A may be set to less than the activation level to turn off the LEDs 50 if emergency/failure conditions are detected. Thus, during normal operation, the switch S1 is maintained in the closed state. As such, the drive current 88 in FIG. 9 is a DC current. While the LEDs 50 are on, the drive current 88 through the LEDs D1-D6 is essentially constant (if switching transients and load imbalances are ignored). Accordingly, the light output from each of the LEDs D1-D6 has a luminous flux that is essentially DC. However, in alternative embodiments, the driver program code may cause the system controller 86 to generate the control output signal 90A as a pulse signal with pulses provided at a pulse frequency. In this case, the drive current 88 itself would be PWM.

In this embodiment, the off-board power supply 12 receives a variable voltage AC signal, perhaps from a triac in a light switch (not shown) with dimming control, and provides a DC drive current to port P1 of the light source module 34. The drive current 88 is provided at a current level sufficient to drive the array of LEDs 50 at an intensity generally commensurate to the desired lumen output of the array of LEDs 50 based on the level of dimming sensed from the variable voltage AC signal received from the triac. As such, the drive current 88 may be provided by the power supply 12, be variable, and generally correspond to the level of dimming set at the light switch. One or more capacitors C1 may be provided at the output of the power supply 12, either internally or externally as shown, in an effort to stabilize the voltage at which the drive current 88 is provided to the array of LEDs 50.

The drive current 88 provided by the power supply 12 may also be used to power the system controller 86 in the control circuitry 76. In this embodiment, the voltage provided at the port P1 is regulated down by the regulated DC supply 82 to a relatively fixed voltage to power the system controller 86. In operation, the drive current provided at the port P1 is generally fixed at a maximum value for a maximum intensity and at corresponding lesser values for any given level of dimming.

With respect to the LED array illustrated in FIG. 9, the array of LEDs 50 is a set of LEDs 50 that includes series-connected LEDs D1-D7 and the LED D8 connected in shunt with the LED D7. The series-connected LEDs D1-D7 are thus coupled to form a string of LEDs 50 between the port P1 and the switch S1, which is coupled to ground. For the drive current 88 to flow through the string of series-connected LEDs D1-D7 in the illustrated embodiment, the system controller 86 must close the switch S1, which may be a transistor, such as a bipolar junction transistor (BJT) or field effect transistor (FET). In one embodiment, the switch S1 is an N-channel FET where a drain is coupled to the string of series-connected LEDs D1-D7, a source is coupled to ground, and a gate is coupled to receive the control output signal 90A in the control output 90 from the system controller 86. A pull down resistor R1 is coupled in shunt to ground between the system controller 86 and the gate of the switch S1. As such, the N-channel FET (the switch S1) is normally off (or in the open state) absent the control output signal 90A from the system controller 86 applying a positive voltage to the gate of the N-channel FET, because the resistor R1 will pull the gate of the N-channel FET to ground.

To direct the drive current 88 through the string of series-connected LEDs D1-D7, the driver program code in the memory 84 causes the system controller 86 to generate the control output signal 90A in the control output 90 such that the control output signal 90A applies a positive voltage to the gate of the N-channel FET. When the positive voltage is applied to the gate, the N-channel FET will turn on and be in the closed state. As such, the string of LEDs D1-D7 is effectively coupled to ground such that the drive current 88 can flow through the series-connected LEDs D1-D7. The flow of the drive current 88 will cause the series-connected LEDs D1-D7 to emit a light output at an intensity that is generally proportional to the magnitude of the drive current 88.

To direct the drive current 88 through the LED D8, the driver program code in the memory 84 causes the system controller 86 to generate the control output signal 90B in the control output 90 such that the control output signal 90B applies a positive voltage to a gate of the switch S2, which in this example is also an N-channel FET. When the positive voltage is applied to the gate, the N-channel FET will turn on and be in the closed state. The drive current 88 thus flows through the LED D8, and the LED D8 emits a light output. To prevent, or at least substantially reduce, the drive current 88 though the LED D8, the driver program code in the memory 84 causes the system controller 86 to generate the control output signal 90B in the control output 90 such that the control output signal 90B applies a low (near zero) voltage to the gate of the switch S2. As such, the LED D8 is effectively bypassed, since the switch S2 is in the open state. By PWM the pulses in the control output signal 90B of the control output 90, the driver program code in the memory 84 causes the system controller 86 to control an luminous flux of the light output emitted from the LED D8. In this example, the light output emitted from the LED D8 is pulsed, wherein pulses of the light output are pulse-width modulated depending on the duty cycle of the control output signal 90B. It should be noted that only the LED D8 is coupled in shunt; however, in other embodiments, more than one of the LEDs 50 may be coupled in shunt. For example, another LED 50 may be coupled in series with the LED D8 so that the light output from both the LED D8 and the other LED 50 coupled in series with the LED D8 is pulse-width modulated.

Referring again to FIG. 9, the control circuitry 76 is adapted to modulate the light with data for transmission such that any change in the color temperature and color based on the light being modulated is anthropically imperceptible. In this embodiment, the driver program code also includes instructions for communicating information to remote devices through the light output emitted by at least one of the solid-state lighting sources, which in this example are the LED D8 and the LED D7. As such, the driver program code allows the control circuitry 76 not only to control the drive current 88 but the driver program code also uses the same components to communicate information. More specifically, the control circuitry 76 is adapted to modulate the pulse frequency of the luminous flux pulses from the light outputs generated by the LED D7 and the LED D8 such that the light from the LED array of LEDs 50 transmit data. With the control output signal 90B, the control output 90 is configured to modulate the light with data for transmission such that any change in the at least one characteristic based on the light being modulated is anthropically imperceptible.

In this embodiment, the driver program code in the memory 84 causes the driver module 52 to modulate the drive current 88 through the LED D8 in accordance with data bits such that a light output from the LED D8 carries a data bit representation of the data bits. The data bit representations are representations of logical states, such as bit states or symbols corresponding to a group of bit states. The data transmitted by the light may include different types of information, such as temperature parameters, product identification numbers, product serial numbers, software revision, tuning parameters, product lifetime, and error reporting parameters. Furthermore, the driver modules may be configured to remotely communicate to each other to accomplish various tasks, such as brightness matching, color matching, or passing along lighting control commands, such as dimming level commands. In this embodiment, the driver module 52 includes a photo receiver 91. The photo receiver 91 can detect a light output from other remote lighting fixtures. The driver program code in the memory 84 causes the system controller 86 to read a data bit representation carried by the light output from other remote lighting fixtures. Furthermore, the driver program code instructs the system controller 86 to translate the data bit representation into the data bits. In this manner, the information from the other remote lighting fixtures can be used to provide lighting control functionality.

It should be noted that the driver program code may cause the light to transmit data and carry the data bit representation with any suitable modulation scheme. In some embodiments, to modulate the light provided by the LED array of LEDs 50 for transmission, the control output 90 is adapted to modulate the light from at least one LED 50 using Frequency Shift Keying (FSK). With regard to the light source module 34 illustrated in FIG. 9, the control circuitry 76 is adapted to modulate the pulse frequency of the luminous flux pulses from the light outputs of the LED D7 and the LED D8 such that the light outputs from the LED D7 and the LED D8 transmit data. As a result, the light from the LEDs 50 in the LED array transmits data since the light outputs from all of the LEDs 50 in the LED array are mixed by the lighting fixture 10 (shown in FIG. 1). The pulse frequency is modulated by the control circuitry 76 such that modulation of the pulse frequency is anthropically imperceptible. As such, unpleasant distortions of the light from the LEDs 50 are avoided.

To modulate the pulse frequency of the luminous flux pulses, the control circuitry 76 modulates the pulse frequency of the control output signal 90B provided by the control output 90. For example, modulating the pulse frequency of the control output signal 90B using FSK, results in the luminous flux pulses of the light outputs from the LED D7 and LED D8 to be modulated using FSK. Accordingly, modulating the pulse frequency of the control output signal 90B using FSK modulates the light from the LEDs 50 in the LED array using FSK. By using FSK, the control output 90 is configured to modulate the light with data for transmission such that any change in the at least one characteristic based on the light being modulated is anthropically imperceptible.

Figure 10:
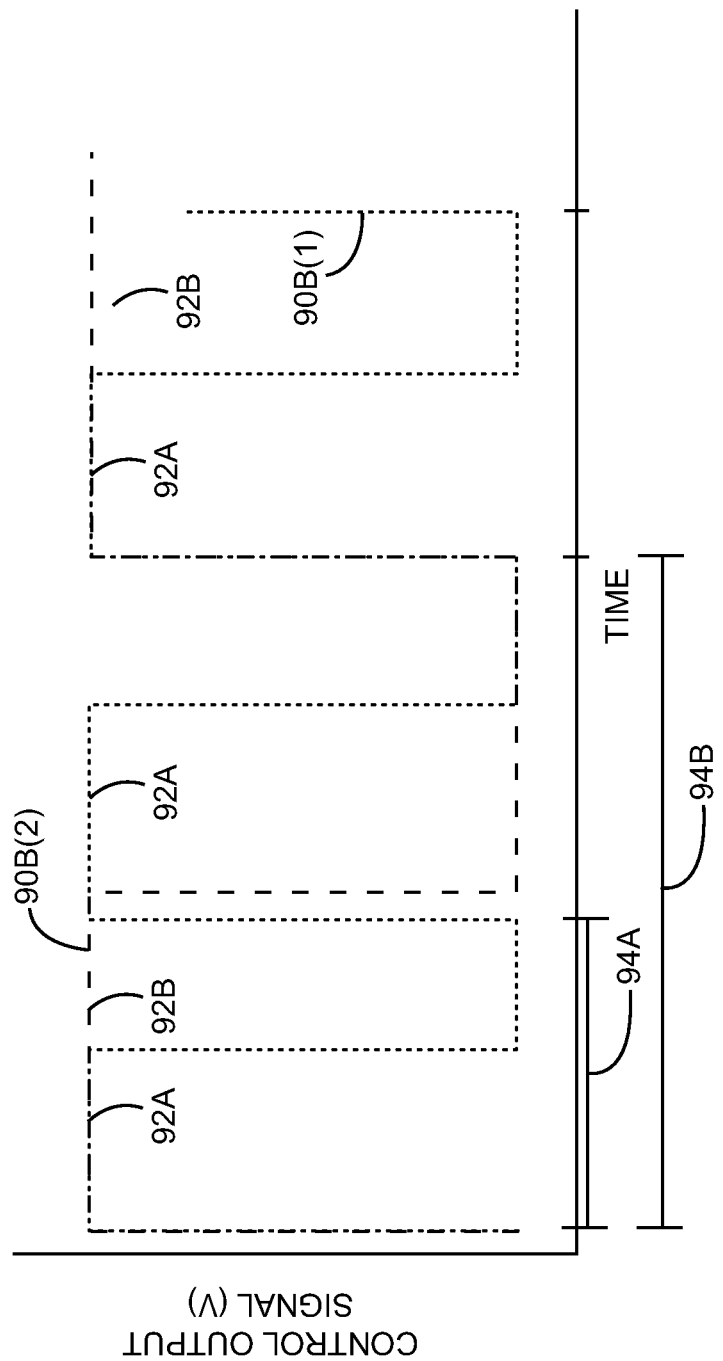
FIG. 10 illustrates exemplary control output signals that are for one type of frequency shift keying (FSK) modulation for controlling shown in FIG. 9 so that the light output from the LED carries representations of data bits.

Referring now to FIGS. 9 and 10, FIG. 10 illustrates a control output signal 90B(1) that is exemplary of the control output signal 90B shown in FIG. 9 for transmitting a first logical state, and a control output signal 90B(2) that is exemplary of the control output signal 90B shown in FIG. 9 for transmitting a second logical state. In this example, the first logical state is a first bit state and the second logical state is a second bit state that is antipodal to the first bit state. The modulation scheme being employed to communicate data is a type of FSK modulation scheme. Accordingly, the control output 90 is configured to modulate the light with data for transmission such that any change in the at least one characteristic based on the light being modulated is anthropically imperceptible.

In this embodiment, the control output signal 90B(1) of FIG. 10 is the control output signal 90B shown in FIG. 9 when no data bits are being represented on the light output from the LED D8. The control output signal 90B(2) of FIG. 10 is the control output signal 90B shown in FIG. 9 when data bits are being represented on the light output from the LED D8. With regard to the control output signal 90B(1), the control output signal 90B(1) includes a plurality of pulses 92A. The pulses 92A are provided at a pulse frequency defined by a first time period 94A. In this example, the first pulse frequency is 8 kilohertz (kHz), but may be any suitable frequency. While one of the pulses 92A is occurring during the first time period 94A, the switch S2 is in the closed state and the drive current 88 is provided through the LED D8. While one of the pulses 92A is not provided during the first time period 94A, the switch S2 is in the open state and the drive current 88 is not provided through the LED D8. A duty cycle is a ratio of an amount of time during the first time period 94A of one of the pulses 92A to an amount of time during the first time period 94A without the one of the pulses 92A. A luminous flux of the light output from the LED D8 is set in accordance with the duty cycle. As explained above, the duty cycle of the luminous flux pulses of the light output from the LED D8 is the same as the duty cycle of the pulses from the control output signal 90B of the control output 90.

The control output signal 90B(2) of FIG. 10 is the control output signal 90B shown in FIG. 9 when a data bit is being represented on the light output from the LED D8. The control output signal 90B(2) also includes a plurality of pulses 92B. The pulses 92B are provided at a second pulse frequency defined by a second time period 94B. In this example, the second pulse frequency is 4 kHz, but the second pulse frequency value may be any suitable frequency. While one of the pulses 92B is occurring during the second time period 94B, the switch S2 is in the closed state and the drive current 88 is provided through the LED D8. While one of the pulses 92B is not provided during the second time period 94B, the switch S2 is in the open state and the drive current 88 is not provided through the LED D8. A duty cycle is a ratio of an amount of time during the second time period 94B of one of the pulses 92B to an amount of time during the second time period 94B without the one of the pulses 92B. An intensity of the light output from the LED D8 is set in accordance with the duty cycle. The duty cycle during the second time period 94B when the data bit is being represented may be maintained the same as the duty cycle during the first time period 94A when no data bits are being represented on the light output of the LED D8. The control output signal 90B thus maintains a constant duty cycle over different frequencies of operation when transmitting the data and when not transmitting the data.

The driver program code causes the driver module 52 to modulate the drive current 88 through the LED D8 such that the data bit representation of the data bits carried by the light output from the LED D8 is anthropically imperceptible. In this embodiment, the data bit representation of the data bits carried by the light output from the LED D8 is maintained anthropically imperceivable because the second pulse frequency defined by the second time period 94B is maintained above a maximum pulse frequency for anthropic perception. Generally, the maximum pulse frequency for anthropic perception is around 500 Hz. Thus, the data bit representation of the data bits is anthropically imperceptible. Accordingly, the control circuitry 76 (shown in FIG. 9) is adapted to modulate the light with data for transmission such that any change in the characteristics of the light based on the light being modulated is anthropically imperceptible. More specifically, any change in the color or color temperature of the light based on the light being modulated with data is anthropically imperceptible because the pulse frequency is maintained above the maximum pulse frequency for anthropic perception. Also, the duty cycle of the luminous flux pulses of the light outputs from the LED D7 and the LED D8 is maintained constant at the first pulse frequency and the second pulse frequency.

Figure 11:
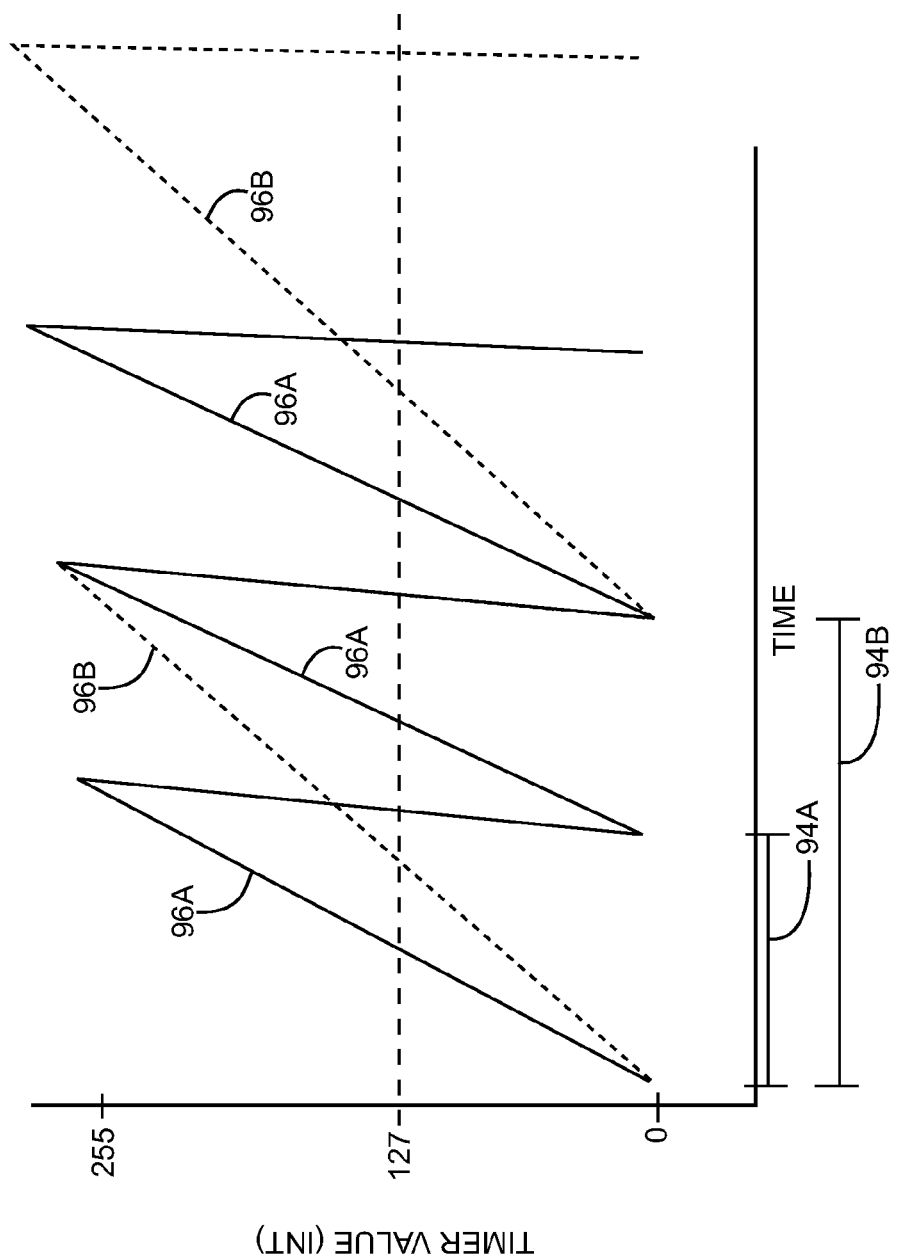
FIG. 11 is a graph illustrating the timer value that demonstrates the function of a timer that may be used by the driver program code to cause the driver module in FIG. 9 to provide the control output signals shown in FIG. 10.

Referring now to FIGS. 10 and 11, FIG. 11 is a graph illustrating the function of a timer that may be used by the driver program code to cause the driver module 52 to provide the control output signal 90B(1) and the control output signal 90B(2) shown in FIG. 10. The timer may utilize a clock oscillator that generates a clock signal. In this embodiment, the timer is operable to increment from 0 to 255 as clock pulses in the clock signal are sensed. Once the timer reaches 255 it goes back to logical "0". Timer value line 96A represents timer values as a function of time for the first pulse frequency defined by the first time period 94A. One cycle in the control output signal 90A(1) lasts for the first time period 94A, since this is the amount of time it takes for the timer values to go from 0 to 255 with the clock signal set to a first clock frequency. The pulses 92A shown in FIG. 10 are provided while the timer value is equal to or less than a pulse setting value, which in this example is 127. Thus, the duty cycle for this example is approximately 50%. By adjusting the pulse setting value, the duty cycle of the control output signal 90A(1) is adjusted.

The clock signal can be adjusted to have a second clock frequency. In this manner, the control output signal 90B(1) shown in FIG. 10 is provided. As shown in FIG. 11, timer value line 96B represents timer values as a function of time for the second pulse frequency defined by the second time period 94B. One cycle in the control output signal 90B(1) lasts for the second time period 94B, since this is the amount of time it takes for the timer values to go from 0 to 255 with the clock signal set to a second clock frequency. The pulses 92B shown in FIG. 10 are provided while the timer value is equal to or less than the pulse setting value, which in this example is 127. Thus, the duty cycle for the control output signal 90B(1) is maintained the same as the duty cycle for the control output signal 90B(2) (approximately 50% in this example).

Figure 12:
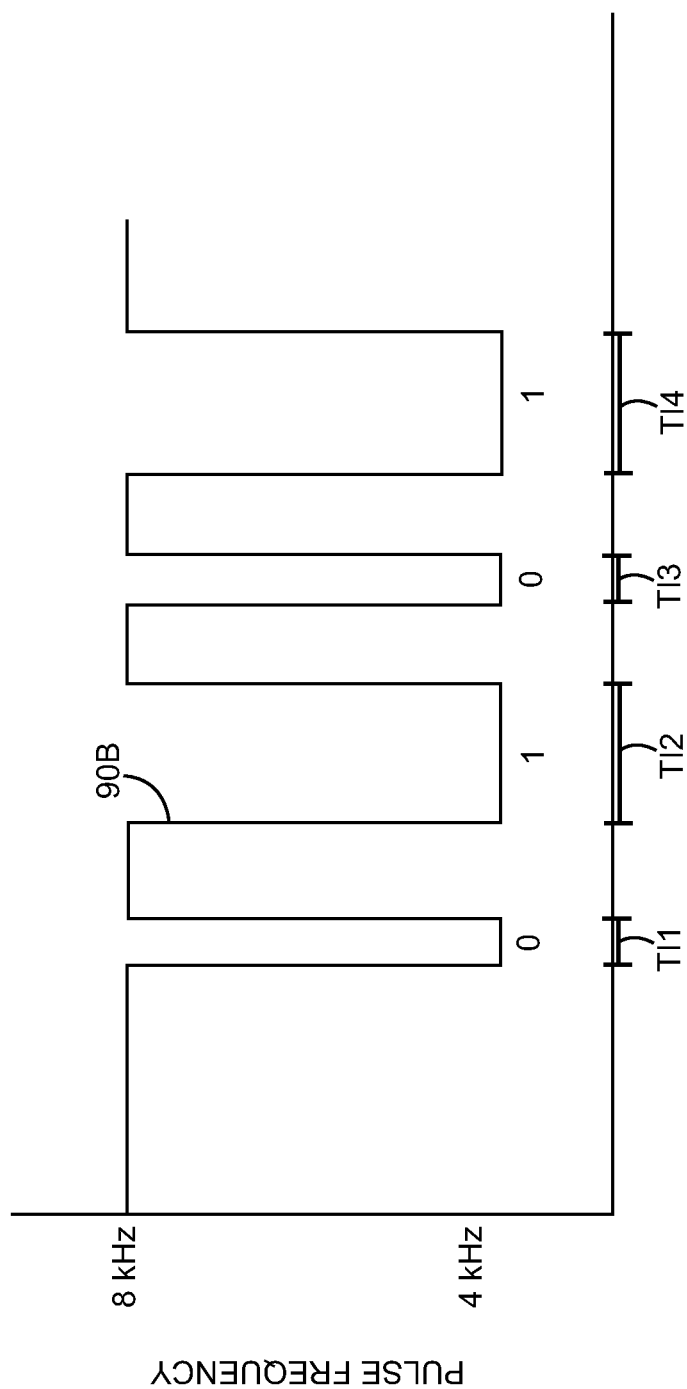
FIG. 12 illustrates one embodiment of a pulse frequency of one of the control output signals for the type of FSK modulation scheme shown in FIG. 10.

Referring now to FIGS. 9 and 12, FIG. 12 illustrates one embodiment of a pulse frequency of the control output signal 90B as a function of time. In this case, the light output emitted from the LED D8 is to carry a data bit representation of the data bits "0101." As shown in FIG. 12, while the pulse frequency is at the first pulse frequency (in this example, 8 kHz), the control output signal 90B is generated so that the light output emitted from the LED D8 carries no representations of data bits. However, while the control output signal 90B is at the second pulse frequency (in this example, 4 kHz), the control output signal 90B is generated so that the light output emitted from the LED D8 carries a representation of one of the data bits. In particular, the control output signal 90B is generated so that the light output emitted from the LED D8 carries the representation of one of the data bits during time intervals (referred to generically as element TI and specifically as time intervals TI1, TI2, TI3, and TI4).

When the time interval TI is less than a temporal length, the control output signal 90B is generated so that the light output emitted from the LED D8 carries a bit representation of a first bit state, which in this example is a logical "0." Thus, the control output signal 90B is generated during both the time intervals TI1 and TI3 so that the light output emitted from the LED D8 carries logical "0." When the time interval TI is greater than the temporal length, the control output signal 90B is generated so that the light output emitted from the LED D8 carries a bit representation of a second bit state that is antipodal to the first bit state, which in this example is a logical "1." Thus, the control output signal 90B is generated during both the time intervals TI2 and TI4 so that the light output emitted from the LED D8 carries logical "1."

Figure 13:
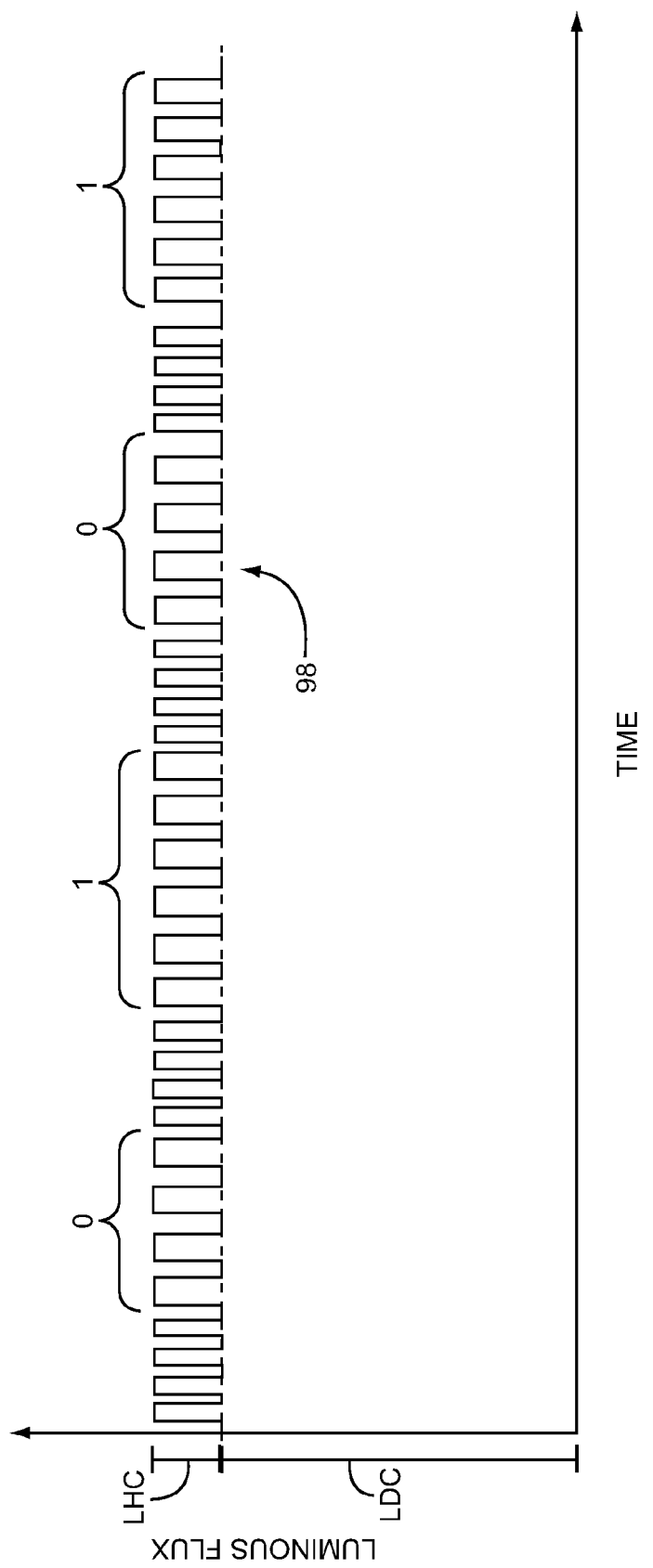
FIG. 13 is a graph of the luminous flux of light emitted from the LEDs in accordance with the type of FSK modulation shown in FIG. 10.

Referring now to FIG. 9 and FIG. 13, FIG. 13 illustrates a graph of the luminous flux of the light 98 emitted from the LEDs 50 in response to the control output 90. Thus, the graph of FIG. 13 is of the light 98 that has been mixed from the light outputs of all of the LEDs 50. In this example, the light 98 has a DC component (LDC), which in this example is the result of the light outputs of the LEDs D1 to D6 in the string of LEDs 50, and is thus the result of the control output signal 90A in the control output 90. The light 98 also has a high frequency component (LHC), which in this example is the result of the light outputs of the LED D7 and the LED D8 in the string of LEDs 50, and is thus the result of the control output signal 90B in the control output 90. The light output of the LED D7 and the LED D8 thus carries a data bit representation of the data bits "0101." As a result, the light 98 carries the data bit representation of the data bits "0101" on the high frequency component LHC. As such, the high frequency component LHC can be filtered from the light 98 and the data bit representation can be translated into the data bits "0101."

Figure 14:
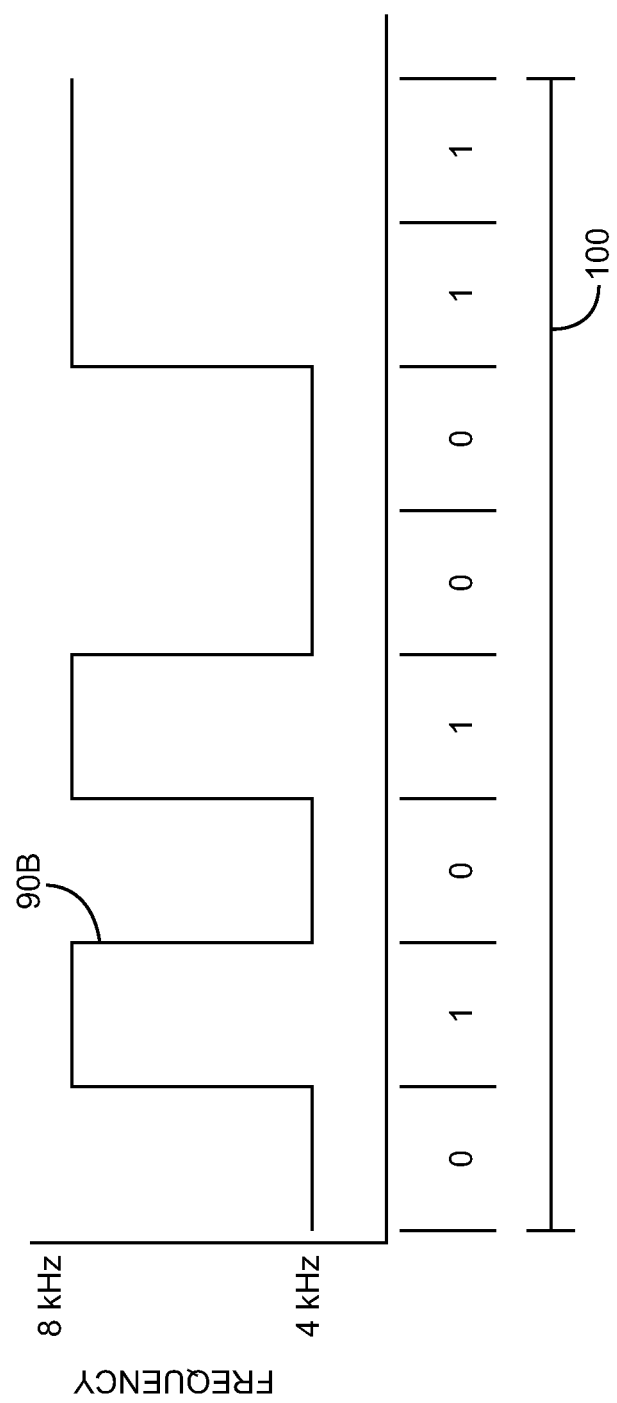
FIG. 14 is a graph of another embodiment of the pulse frequency of the control output signals that control the drive current through the one of the LEDs for another type of FSK modulation scheme.

Referring now to FIG. 9 and FIG. 14, FIG. 14 is a graph of another embodiment of a pulse frequency of the control output signal 90B for another type of FSK modulation scheme. In this example, the control output signal 90B is generated so that the light output from the LED D8 carries a data bit representation of data bits "01010011." When no data is to be represented in the light output of the LED D8, the pulse frequency is at the first pulse frequency (in this example, 8 kHz). However, during a data transmission time interval 100, the control output signal 90B is generated to have the first pulse frequency so that the light output emitted from the LED D8 carries a representation of a first bit state, which in this example is a logical "1." During the data transmission time interval 100, while the control output signal 90B is at the second pulse frequency (in this example, 4 kHz), the control output signal 90B is generated so that the light output emitted from the LED D8 carries a representation of an antipodal bit state, which in this example is a logical "0." The data transmission time interval 100 can be initiated by an initializing bit pattern (such as "010") on the data bit representation. As such, the particular FSK modulation scheme described with regard to FIG. 14 may require time synchronization between the driver module 52 and a receiver.

While the embodiments described herein are implemented using FSK, any suitable modulation scheme other than FSK may also be implemented to modulate the light from the LED array. For example, amplitude shift keying (ASK), on-off keying (OOK), pulse-shift keying (PSK), trellis modulation, other frequency modulation techniques, and/or the like may be used. In addition, using the photo receiver 91, the control circuitry 76 may receive data transmitted from remote lighting fixtures that has been modulated in accordance with any of the described modulation schemes.

Figure 15:
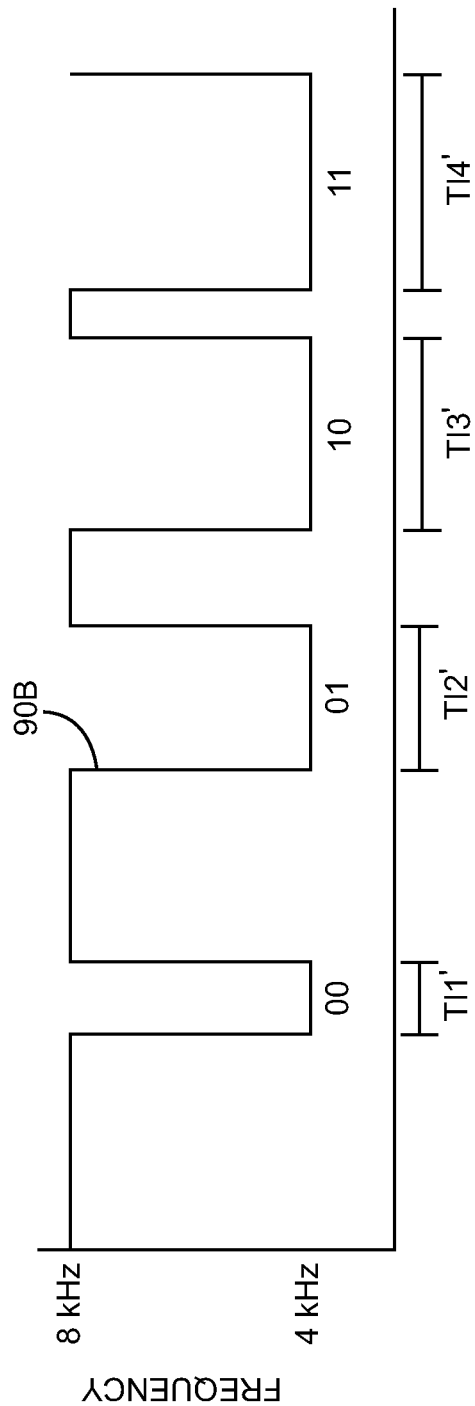
FIG. 15 illustrates another embodiment of the pulse frequency of the control output signals that control the drive current through the one of the LEDs for still another type of FSK modulation scheme.

Referring now to FIG. 15, FIG. 15 illustrates another embodiment of a pulse frequency of the control output signal 90B as a function of time for still another FSK modulation scheme. In this case, the light output emitted from the LED D8 is to carry a data bit representation of the data bits "00011011." The light output transmits data in four logical state, which in this example are symbols representing groups of bit states. As shown in FIG. 15, while the pulse frequency is at the first pulse frequency (in this example, 8 kHz), the control output signal 90B is generated so that the light output emitted from the LED D8 carries no representations of data bits. However, while the pulse frequency is at the second pulse frequency (in this example, 4 kHz), the control output signal 90B is generated so that the light output emitted from the LED D8 carries a representation of symbols that correspond to a group of data bits. In particular, the control output signal 90B is generated so that the light output emitted from the LED D8 carries the representation of symbols for the data bits during time intervals (referred to generically as element TI' and specifically as time intervals (TI1', TI2', TI3', and TI4').

When the time interval TI' is less than a first temporal length, the control output signal 90B is generated so that the light output emitted from the LED D8 carries a bit representation of a first symbol for logical "00." As shown in FIG. 15, the time interval TI1' is less than the first temporal length. As a result, the light output emitted from the LED D8 carries a bit representation of the first symbol.

When the time interval TI' is between the first temporal length and a second temporal length (which is longer than the first temporal length), the control output signal 90B is generated so that the light output emitted from the LED D8 carries a bit representation of a second symbol for logical "01." As shown in FIG. 15, the time interval TI2' is between the first temporal length and the second temporal length. As a result, the light output emitted from the LED D8 carries a bit representation of the second symbol.

When the time interval TI' is between the second temporal length and a third temporal length (which is longer than the second temporal length), the control output signal 90B is generated so that the light output emitted from the LED D8 carries a bit representation of a third symbol for logical "10." As shown in FIG. 15, the time interval TI3' is between the second temporal length and the third temporal length. As a result, the light output emitted from the LED D8 carries a bit representation of the third symbol.

When the time interval TI' is greater than the third temporal length, the control output signal 90B is generated so that the light output emitted from the LED D8 carries a bit representation of a fourth symbol for logical "11." As shown in FIG. 15, the time interval TI4' is greater than the third temporal length. As a result, the light output emitted from the LED D8 carries a bit representation of the fourth symbol.

It should be noted that while the example described with regard to FIG. 15 uses four symbols, each corresponding to a group of two bits, alternative embodiments may use any number of symbols corresponding to a group of any number of bits. Furthermore, any other suitable modulation scheme other than FSK may also be implemented to modulate the drive current 88 (shown in FIG. 9) through the LED D8 (or any other set of LEDs 50) so that the light carries bit representations of bit states or symbols. For example, ASK, OOK, PSK, trellis modulation, other frequency modulation techniques, and/or the like may be used.

Figure 16:
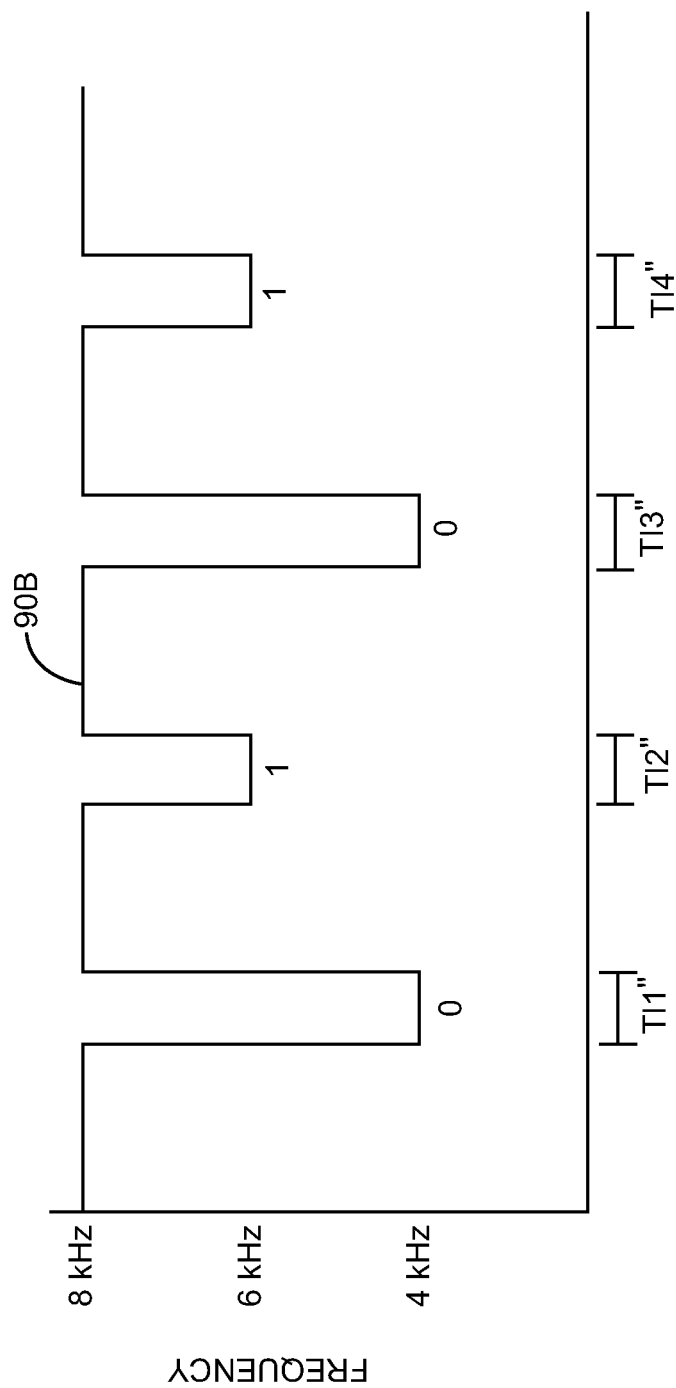
FIG. 16 illustrates another embodiment of the pulse frequency of the control output signal that control the drive current through the one of the LEDs for yet another type of FSK modulation scheme.

Referring now to FIG. 16, FIG. 16 illustrates another embodiment of a pulse frequency of the control output signal 90B as a function of time for still another FSK modulation scheme. In this case, the light output emitted from the LED D8 is to carry a data bit representation of the data bits "0101." As shown in FIG. 16, while the pulse frequency is at the first pulse frequency (in this example, 8 kHz), the control output signal 90B is generated so that the light output emitted from the LED D8 carries no representations of data bits. However, while the pulse frequency is at the second pulse frequency (in this example, 6 kHz), the control output signal 90B is generated so that the light output emitted from the LED D8 carries a bit state, which in this example is logical "1." Unlike the embodiment described with regard to FIG. 12, an amount of time that the control output signal 90B is at the second pulse frequency does not indicate the bit state. Rather, the bit state (i.e., a logical "1") is indicated simply by the second pulse frequency. Thus, the light output from the LED D8 carries a logical "1" representation as a result of the control output signal 90B during time intervals TI2" and TI4". Also, while the control output signal 90B is at a third pulse frequency (in this example, 4 kHz), the control output signal 90B is generated so that the light output emitted from the LED D8 carries a bit state, which in this example is logical "0." The bit state (i.e., a logical "0") is indicated simply by the third pulse frequency. Thus, the light output from the LED D8 carries a logical "0" representation as a result of the control output signal 90B during time intervals TI1" and TI3".

Figure 17:
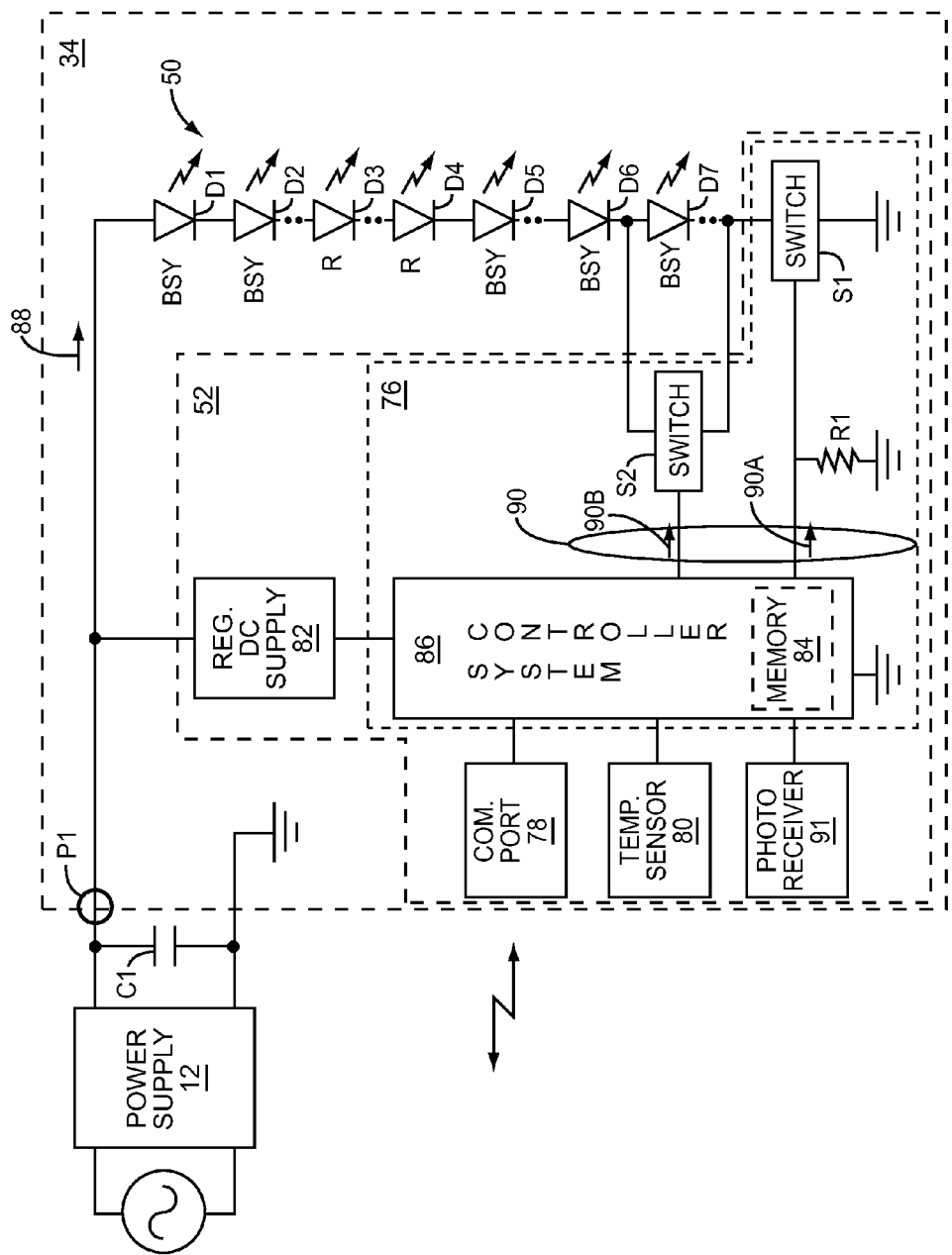
FIG. 17 illustrates another embodiment of the light source module including another embodiment of the driver module and another embodiment of the array of LEDs.

FIG. 17 illustrates another embodiment of the light source module 34 including another embodiment of the driver module 52 and another embodiment of the LED array of the LEDs 50. The LED array of LEDs 50 is the same as the array of LEDs 50 shown in FIG. 9, except that the LED array of the LEDs 50 shown in FIG. 15 does not include the LED D8 coupled in shunt with the LED D7. Furthermore, the driver module 52 in FIG. 17 is the same as the driver module 52 shown in FIG. 14, except that the switch S2 in FIG. 17 is configured to allow the drive current 88 through the LED D7 when the switch S2 is in the open state. When the switch S2 is in the closed state, the drive current 88 bypasses the LED D7. Thus, the control output signal 90B of the control output 90 is generated so that the light output of the LED D7 is modulated to carry a data bit representation of data bits, as explained with regard to the embodiment shown in FIG. 9 above.

Figure 18:
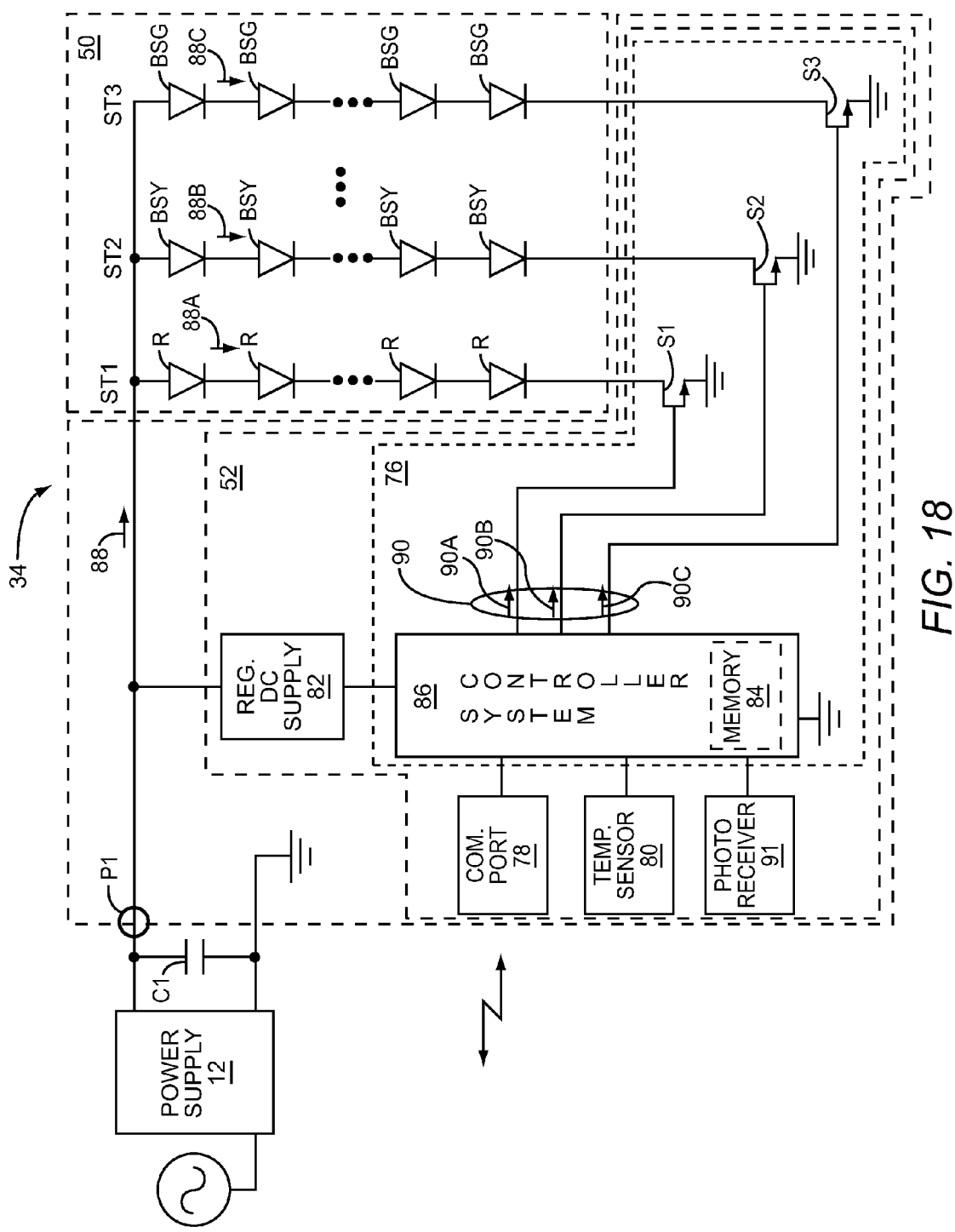
FIG. 18 illustrates still another embodiment of the light source module including still another embodiment of the driver module and another embodiment of the array of LEDs.

FIG. 18 illustrates another embodiment of the light source module 34 including another embodiment of the driver module 52 and another embodiment of the array of the LEDs 50. The LED array includes a plurality of strings ST1, ST2, and ST3. In this embodiment, the LEDs 50 in the string ST1 are red, the LEDs 50 in the string ST2 are BSY, and the LEDs 50 in the string ST3 are BSG. The LEDs 50 within each string ST1, ST2, and ST3 are homogenous in color. In alternative embodiments, one or more of the strings ST1, ST2, and ST3 may include LEDs 50 that are heterogeneous in color.

In this embodiment, the string ST1, ST2, and ST3 are coupled to one another in parallel. Accordingly, the driver current 88 is split into drive currents 88A, 88B, and 88C. The drive current 88A is provided through the LEDs 50 in the string ST1, the drive current 88B is provided through the LEDs 50 in the string ST2, and the drive current 88C is provided through the LEDs 50 in the string ST3. The control circuitry 76 shown in FIG. 18 includes switches S1, S2, and S3 and the control circuitry 76 is configured to generate the control output 90 to control the respective drive currents 88A, 88B, and 88C. More specifically, the control output 90 includes control output signals 90A, 90B, and 90C. The control output signal 90A is operable to switch the switch S1 to and from the open state and the closed state. When the switch S1 is in the closed state, the drive current 88A is provided to the LEDs 50 in the string ST1 and thus all of the LEDs 50 in the string ST1 are activated to generate a light output. When the switch S1 is in the open state, the drive current 88B is prevent from flowing through the LEDs 50 in the string ST1 and thus all of the LEDs 50 in the string ST2 are deactivated. The control output signal 90B is operable to switch the switch S2 to and from the open state and the closed state. When the switch S1 is in the closed state, the drive current 88B is provided to the LEDs 50 in the string ST2 and thus all of the LEDs 50 in the string ST2 are activated to generate a light output. When the switch S2 is in the open state, the drive current 88B is prevented from flowing through the LEDs 50 in the string ST2 and thus all of the LEDs 50 in the string ST2 deactivated. The control output signal 90C is operable to switch the switch S3 to and from the open state and the closed state. When the switch S3 is in the closed state, the drive current 88C is provided to the LEDs 50 in the string ST3 and thus all of the LEDs 50 in the string ST3 are activated to generate a light output. When the switch S3 is in the open state, the drive current 88C is prevent from flowing though the LEDs 50 in the string ST3 and thus all of the LEDs 50 in the string ST3 are deactivated.

The control circuitry 76 may provide the control output signals 90A, 90B, and 90C in any manner to set the characteristics of light generated by the LED 50 and to modulate the light with data for transmission. For example, the control circuitry 76 may generate each of the control output signals 90A, 90B, and 90C to control all of the drive currents 88A, 88B, and 88C in the same manner. In one embodiment, each of the control output signals 90A, 90B, and 90C may be pulsed synchronously so that a luminous flux of every one of the light outputs varies with synchronous luminous flux pulses. The control circuitry 76 may modulate the pulse width and the pulse frequency of the luminous flux pulses so that the light outputs of all of the LEDs 50 sets one or more characteristics of the light from the LEDs 50 in the LED and so that the light outputs of all of the LEDs 50 transmit data. For example, dimming may be controlled by modulating the pulse width of the luminous flux pulses of all of the LEDs. Data may be transmitted by all of the light outputs by modulating the pulse frequency of all of the LEDs 50 using FSK modulation.

The control circuitry 76 may modulate a pulse width of the luminous flux pulses to set a color temperature of the light from the LEDs 50 in the array. More specifically, modulation the pulse width of luminous flux pulses from the light outputs of the LEDs 50 in the string ST1 sets an amount red visible light. Since the light outputs of all of the LEDs 50 in the array are mixed, modulating the pulse widths of the luminous flux pulses of the light outputs from the LEDs 50 in the string ST1 regulates the luminous flux of red visible light and the sets the color temperature of light from the LEDs 50. In addition, the control circuitry 76 is configured to modulate the light with data for transmission using any one of the FSK modulation schemes described above. As a result, the light outputs from the LEDs 50 in the string ST1 transmit data. By mixing the light outputs from the LEDs 50 in the string ST1 with the light outputs from the LEDs 50 in the string ST2 and ST3, the light from the LEDs 50 in the LED array can transmits data to remote devices.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture for general lighting purposes, comprising:
    an array of solid-state light sources configured to generate light for general illumination; and
    control circuitry configured to control a drive signal to at least one solid-state light source of the array of the solid-state light sources with a control output which is configured to:
        set at least one characteristic of the light generated by the array of the solid-state light sources; and
        modulate the light generated by the at least one solid-state light source with data for transmission using frequency shift keying (FSK) such that any change in the at least one characteristic based on the light being modulated is anthropically imperceptible, wherein the light from the at least one solid-state light source is pulse-width modulated (PWM) at a first frequency and a first duty cycle to represent a first bit state and the light from the at least one solid-state light source is PWM at a second frequency and a second duty cycle to represent a second bit state.

2. The lighting fixture of claim 1 wherein the at least one solid-state light source comprises all of the solid-state light sources in the array.

3. The lighting fixture of claim 1 wherein the at least one solid-state light source is a proper subset of the solid-state light sources in the array.

4. The lighting fixture of claim 3 wherein:
    the array of the solid-state light sources comprises a plurality of strings of solid-state light sources; and
    the proper subset of the solid-state light sources resides in one of the plurality of strings.

5. The lighting fixture of claim 3 wherein:
    the array of the solid-state light sources comprises a plurality of strings of solid-state light sources; and
    the proper subset of the solid-state light sources is distributed among at least two of the plurality of strings.

6. The lighting fixture of claim 1 wherein the array of solid-state light sources comprises a string of solid-state light sources and the at least one solid-state light source comprises one of the solid-state light sources in the string.

7. The lighting fixture of claim 6 wherein the array of solid-state light sources further comprises a solid-state light source coupled in shunt with the one of the solid-state light sources in the string, and the at least one solid-state light source further comprises the solid-state light source coupled in shunt with the one of the solid-state light sources in the string.

8. The lighting fixture of claim 1 wherein the array of solid-state light sources comprises a string of solid-state light sources and the at least one solid-state light source comprises a solid-state light source coupled in shunt with one of the solid-state light sources in the string.

9. The lighting fixture of claim 1 wherein the array of solid-state light sources comprises light-emitting diodes (LEDs) of only one color.

10. The lighting fixture of claim 1 wherein the array of solid-state light sources comprises light-emitting diodes (LEDs) of different colors, wherein the at least one solid-state light source includes an LED from a group of LEDs of a first one of the different colors, and another solid-state light source in the array that is not included with the at least one solid-state light source is an LED from a group of LEDs of a second one of the different colors.

11. The lighting fixture of claim 1 wherein the first duty cycle and the second duty cycle are the same.

12. The lighting fixture of claim 11 wherein the first frequency and the second frequency each define a temporal length of pulse cycles for PWM.

13. The lighting fixture of claim 1 wherein the light from the at least one solid-state light source is PWM at a third frequency when no data is being transmitted.

14. The lighting fixture of claim 1 wherein the control output comprises a PWM signal that maintains a constant duty cycle over different frequencies of operation when transmitting the data and when not transmitting the data.

15. The lighting fixture of claim 1 wherein the at least one characteristic includes one or more characteristics in a set of characteristics, wherein the set comprises an intensity, a color temperature, and a color.

16. A lighting fixture for general lighting purposes, comprising:
an array of solid-state light sources configured to generate light for general illumination; and
control circuitry configured to control a drive signal to at least one solid-state light source of the array of the solid-state light sources with a control output which is configured to:
set at least one characteristic of the light generated by the array of the solid-state light sources; and
modulate the light with data for transmission using frequency shift keying (FSK) such that any change in the at least one characteristic based on the light being modulated is anthropically imperceptible wherein the light from the at least one solid-state light source is modulated at a first frequency to represent a first logical state, the light from the at least one solid-state light source is modulated at a second frequency to represent a second logical state, and the light from the at least one solid-state light source is modulated at a third frequency when no data is being transmitted.

17. The lighting fixture of claim 16 wherein the light from the at least one solid-state light source utilizes pulse-width modulation (PWM) such that a duty cycle of the PWM is constant at the first frequency and at the second frequency.

18. The lighting fixture of claim 17 wherein the first frequency and the second frequency each define a temporal length of pulse cycles for the PWM.

19. The lighting fixture of claim 16 wherein the first logical state is a first symbol and the second logical state is a second symbol.

20. A lighting fixture for general lighting purposes, comprising:
an array of solid-state light sources configured to generate light for general illumination; and
control circuitry configured to control a drive signal to at least one solid-state light source of the array of the solid-state light sources with a control output which is configured to:
set at least one characteristic of the light generated by the array of the solid-state light sources; and
modulate the light with data for transmission such that any change in the at least one characteristic based on the light being modulated is anthropically imperceptible wherein when the data is not being transmitted, light from the at least one solid-state light source is modulated at a first frequency, when data is being transmitted, the light from the at least one solid-state light source is modulated at a second frequency such that a first temporal period of transmission of the light from the at least one solid-state light source at the second frequency represents a first logic state and a second temporal period of transmission of light from the at least one solid-state light source at the second frequency represents a second logic state.

21. The lighting fixture of claim 20 wherein the second frequency corresponds to a first logic state and wherein when data is being transmitted the at least one solid-state light source is also modulated at a third frequency, the third frequency corresponding to a second logic state.

* * * * *